Aug. 12, 1958 W. H. T. HOLDEN ET AL 2,847,508

STAGE-BY-STAGE ALL-RELAY TELEPHONE SWITCHING
SYSTEM USING VOICE FREQUENCY CONTROL

Filed Feb. 4, 1954 10 Sheets-Sheet 1

INVENTORS W. H. T. HOLDEN
E. VROOM
BY R. D. Covell
ATTORNEY

Aug. 12, 1958 W. H. T. HOLDEN ET AL 2,847,508

STAGE-BY-STAGE ALL-RELAY TELEPHONE SWITCHING SYSTEM USING VOICE FREQUENCY CONTROL

Filed Feb. 4, 1954 10 Sheets-Sheet 2

INVENTORS W. H. T. HOLDEN
E. VROOM

BY R. O. Covell

ATTORNEY

INVENTORS W. H. T. HOLDEN
E. VROOM
BY
R. O. Colwell
ATTORNEY

INVENTORS W. H. T. HOLDEN
E. VROOM
BY R. O. Covell
ATTORNEY

INVENTORS W. H. T. HOLDEN
E. VROOM
BY R.O. Covell
ATTORNEY

Aug. 12, 1958 W. H. T. HOLDEN ET AL 2,847,508

STAGE-BY-STAGE ALL-RELAY TELEPHONE SWITCHING SYSTEM USING VOICE FREQUENCY CONTROL

Filed Feb. 4, 1954 10 Sheets-Sheet 6

INVENTORS W. H. T. HOLDEN
E. VROOM
BY
R. O. Covell
ATTORNEY

Aug. 12, 1958 W. H. T. HOLDEN ET AL 2,847,508

STAGE-BY-STAGE ALL-RELAY TELEPHONE SWITCHING SYSTEM USING VOICE FREQUENCY CONTROL

Filed Feb. 4, 1954 10 Sheets-Sheet 7

INVENTORS W. H. T. HOLDEN
E. VROOM
BY
R. O. Covell
ATTORNEY

Aug. 12, 1958 W. H. T. HOLDEN ET AL 2,847,508

STAGE-BY-STAGE ALL-RELAY TELEPHONE SWITCHING SYSTEM USING VOICE FREQUENCY CONTROL

Filed Feb. 4, 1954 10 Sheets-Sheet 8

INVENTORS W. H. T. HOLDEN
E. VROOM
BY R. O. Covell
ATTORNEY

INVENTORS W. H. T. HOLDEN
E. VROOM
BY
R. O. Covell
ATTORNEY

Aug. 12, 1958 W. H. T. HOLDEN ET AL 2,847,508

STAGE-BY-STAGE ALL-RELAY TELEPHONE SWITCHING SYSTEM USING VOICE FREQUENCY CONTROL

Filed Feb. 4, 1954 10 Sheets-Sheet 10

INVENTORS W. H. T. HOLDEN
E. VROOM

BY R. O. Covell

ATTORNEY 2,847,508
Patented Aug. 12, 1958

2,847,508

STAGE-BY-STAGE ALL-RELAY TELEPHONE SWITCHING SYSTEM USING VOICE FREQUENCY CONTROL

William H. T. Holden, Pasadena, Calif., and Edward Vroom, Brooklyn, Conn., assignors to Bell Telephone Laboratories, Incorporated, New York, N. Y., a corporation of New York Application February 4, 1954, Serial No. 408,120

14 Claims. (Cl. 179—16)

This invention relates to an automatic telephone switching system in which the switching operations are controlled by the transmission of audio frequency signals on a two-out-of-five code basis. More particularly, this invention relates to a stage-by-stage or step-by-step type switching system in which the switching functions are effected by apparatus at the central office under the control of signal current impulses of selected frequencies generated within the subscriber subsets and transmitted to the central office over the subscriber lines on a two-out-of-five code basis.

An object of the invention is to provide a telephone switching system in which the switching functions are controlled by the transmission of audio frequency signals generated on a two-out-of-five code basis so that a calling subscriber can transmit data representing the desired called number to the central office by means of digit keys at his subset.

Another object of the invention is to provide a step-by-step type telephone switching system which, for the most part, contains no moving parts other than relay armatures so that the time required for the switching operations may be reduced to a minimum.

Another object of the invention is to equip subscriber subsets with a plurality of tone generators arranged in a two-out-of-five code basis so that tones may be transmitted to a switching center at which is located receiving equipment which responds to the transmitted tones and controls subsequent switching operations.

A feature of the invention is the use of reed generators at each subscriber station to generate audible tones on a two-out-of-five code basis for controlling the operation of the entire switching system.

Another feature of the invention is the use of cold cathode tubes at each switching station to control operation of the switching equipment.

The invention may be more fully understood from the following detailed description of a preferred exemplary embodiment thereof when read with reference to the accompanying drawings in which.

Figures 1, 2:
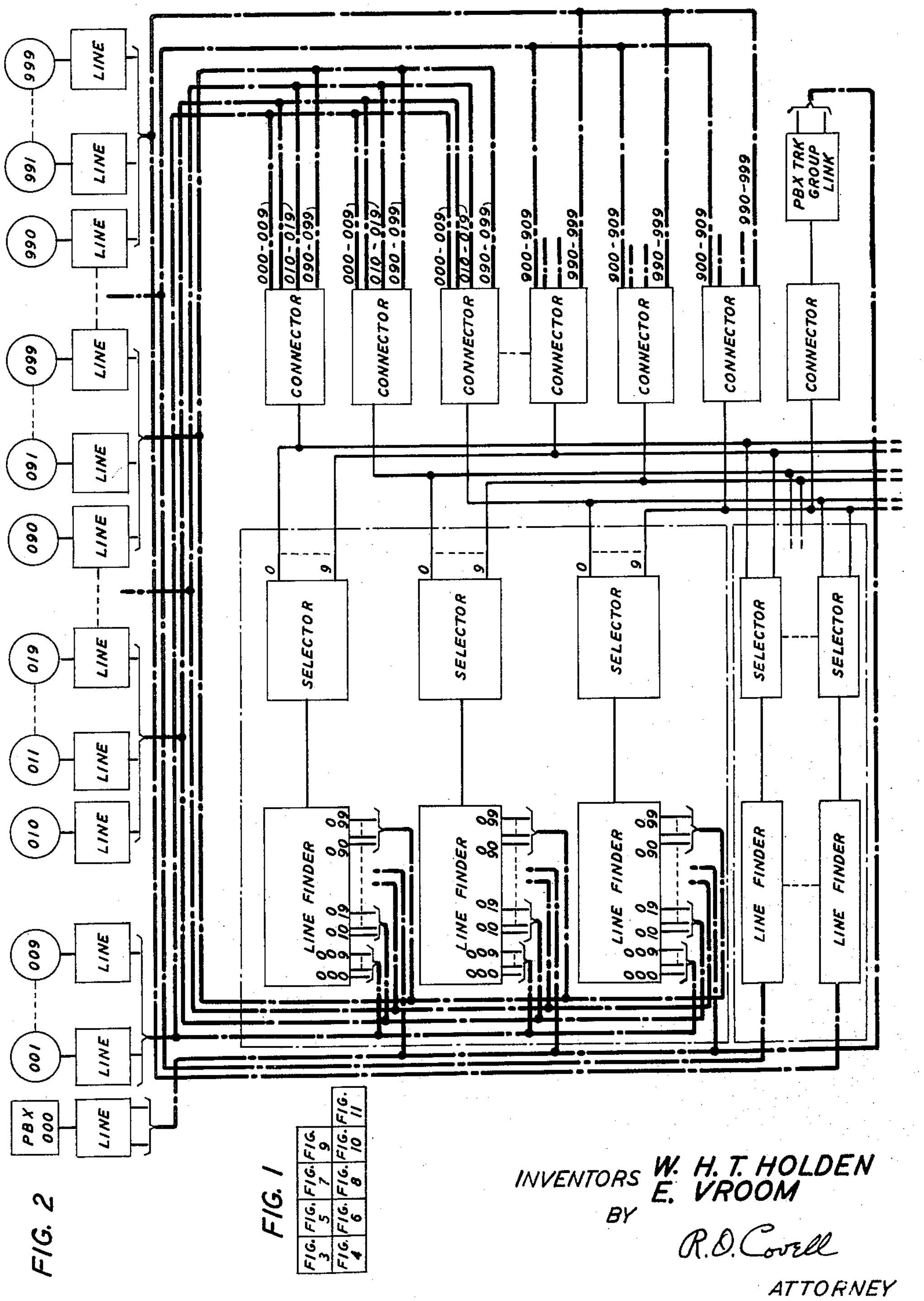
Fig. 1 shows how Figs. 3 through 11 should be placed in relation to one another.
Fig. 2 shows a block diagram which illustrates the broad elements of the switching system.

The block diagram shown in Fig. 2 illustrates the general relationship between elements in the disclosed telephone switching system. The specific embodiment shown in Fig. 2 discloses a 1000-line, single office, switching system having only one selector stage between the line finders and the connectors. It should be appreciated that this showing is merely exemplary and that as many line finders, selectors, and connectors as may be desired could be utilized in the switching system disclosed without departing from the spirit and scope of the invention. Also, a plurality of selector stages and central offices could be utilized, if desired. It is not believed that a detailed discussion of Fig. 2 is warranted inasmuch as the block diagram shown therein discloses a relationship between elements that is analogous to that which exists in the conventional step-by-step switching system now widely used commercially.

The PBX trunk group link circuit shown diagrammatically on Fig. 2 may be worthy of additional description at this point. This PBX circuit is designed to serve large customers, such as department stores, governmental agencies, etc. having a large number of incoming telephone lines all designated by the same directory number. When such customers are served by a PBX circuit of the type shown diagrammatically in Fig. 2 and in Fig. 11 in full, the entire group of lines serving the customer has the same directory designation. In some of the older type circuits a group of many lines serving one customer appears to have the same directory designation in the telephone book, but actually only the directory designation for the lowest numbered line is listed and dialed by a calling party, whereupon hunting circuits are actuated to hunt for an idle line beginning with the lowest numbered line and progressively hunting upwards in a numerical order. This type of arrangement actually utilizes as many different directory numbers as there are lines serving the customer. The present arrangement overcomes this needless waste of directory numbers and combines all the lines serving a single customer into the same directory designation.

In making a call to a customer having a plurality of lines and served by a PBX, the calling party keys the called station directory number, thereby causing seizure of a line finder and a selector, actuation of the selector in accordance with a digit representing part of the designation of a called station, seizure of a connector, and actuation of the connector in accordance with two digits representing parts of the designations of the called party's directory number, as is done in a regular call. The actuated connector then connects the calling party to a PBX trunk circuit rather than directly to the tip, ring and sleeve leads of the called party as is done in a regular call. As the connector connects the calling party to the PBX trunk hunting circuit, the PBX circuit is actuated and commences hunting to find an idle line in the group of lines serving the called party. As soon as the PBX hunting circuit finds such an idle line, the hunting action ceases and the calling party is then connected directly through to an idle line serving the called party. Ringing and the answering of the call by the called party then takes place in the usual manner.

Fig. 2 diagrammatically shows only one connector circuit associated with the PBX trunk circuit. This simplified and skeletonized diagrammatic showing has been made with a view towards simplicity in presentation. In practice, as many connector circuits as may be desired can be associated with each trunk hunting circuit in order to serve customers having a plurality of incoming lines.

Figure 3:
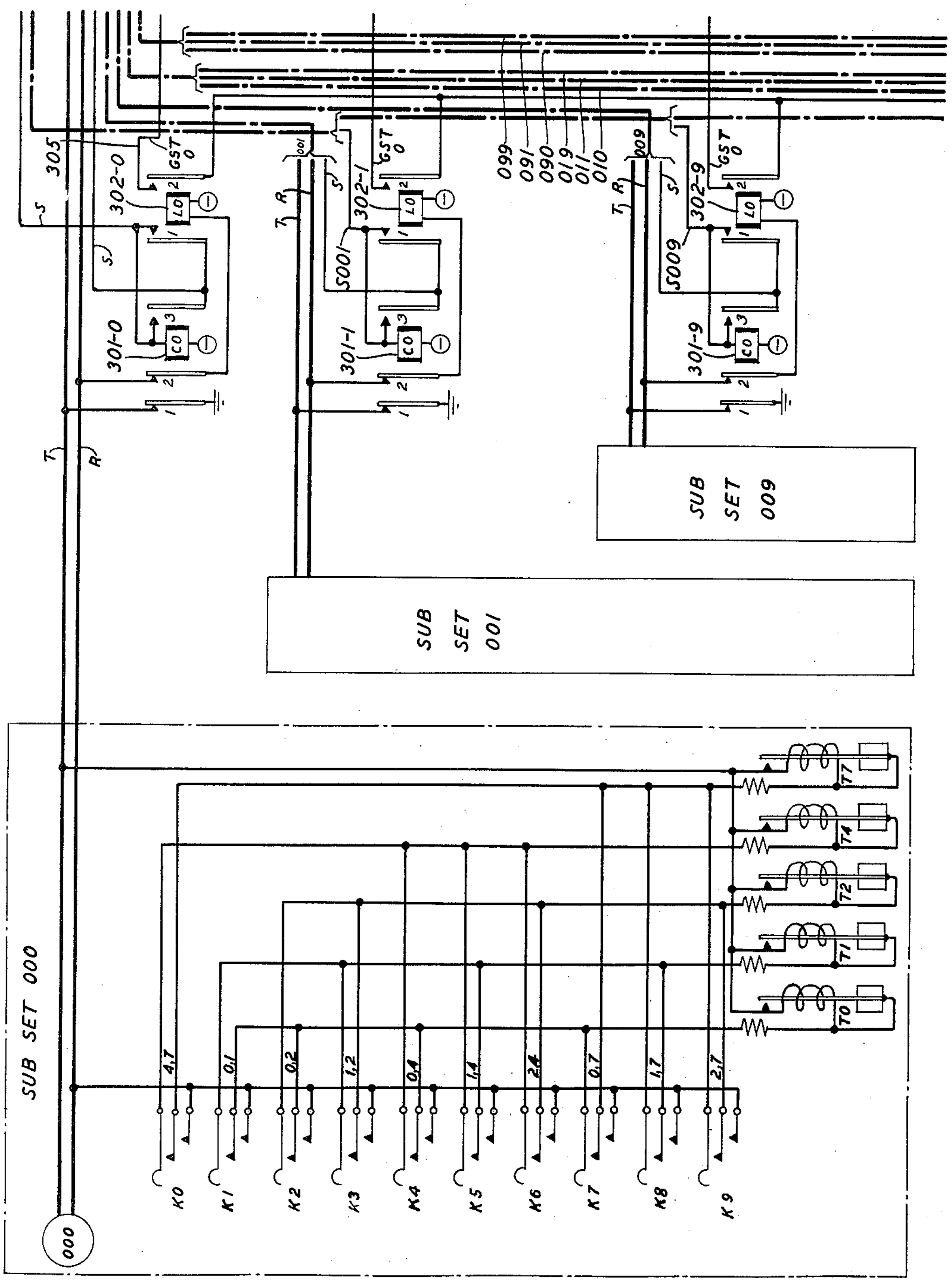
Figs. 3 and 4 show a plurality of subscribers' subsets, the equipment located therein and the line circuit associated with each subscriber line.
Figure 4:
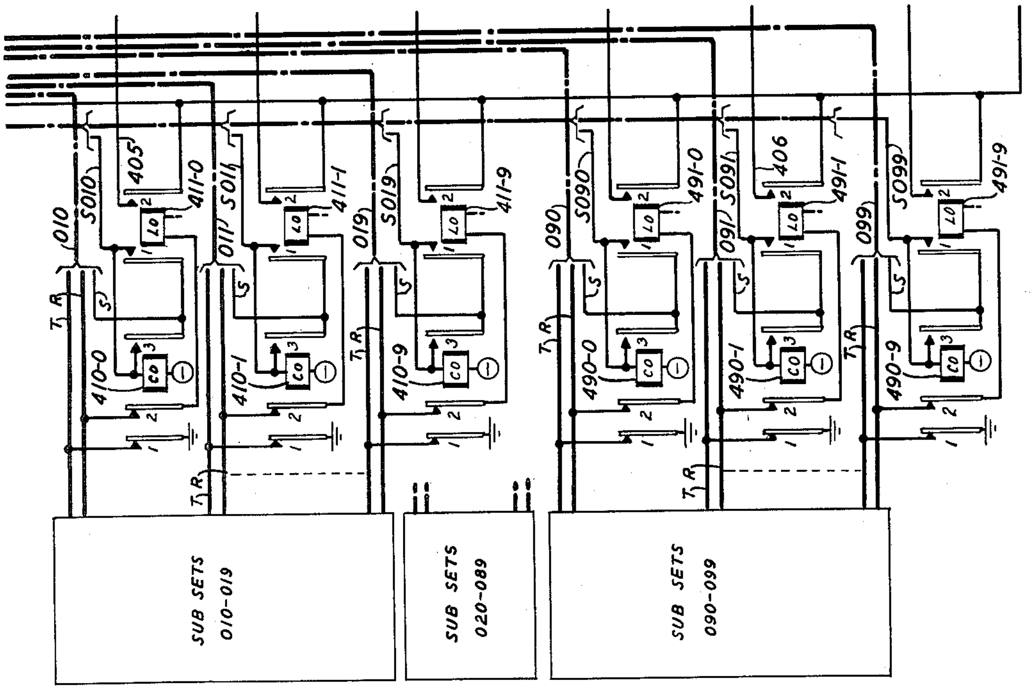

Figs. 3 and 4 together disclose the subscriber subsets along with the associated line circuits. Fig. 3 discloses the complete circuit of the signaling equipment in the subscriber 000 subset. All the other subsets contain identical equipment. The subsets for subscribers 001 through 009 are shown diagrammatically on Fig. 3. The rectangles designated subsets 010 through 019, 020 through 089 and 090 through 099 in Fig. 4 diagrammatically illustrate the remaining subsets in this group of 100 lines. The line circuits and associated wiring for subscribers 000 through 019, 010 through 019 and 090 through 099 are shown in full in Figs. 3 and 4. The line circuits and associated wiring for subscribers 020 through 089 and for subscribers 100 through 999 have been omitted from the present showing for the purpose of simplicity in presentation.

At this point it may be desirable to describe in a general manner the operation of the system. As any one of the subscribers lifts the receiver of his subset, as is diagrammatically shown in Figs. 3 and 4, in an attempt to place a call, a relay in his line circuit, for example relay 302–0 for subscriber 000, operates and places a positive potential on a conductor, such as conductor 305, serving the group of ten lines in which the calling party is located.

The conductor upon which this potential has been placed applies this potential to the tube in each line finder circuit designed to serve the group of ten lines in which the calling party is located. In line finder 0 this tube would be located in the group of tubes 500. All the tubes upon which this potential has been placed that are in idle line finders attempt to fire. However, one tube out of this group is faster to fire than all the rest, and in firing it prevents the other tubes from firing by means of a lockout circuit common to all these tubes.

Figure 7:
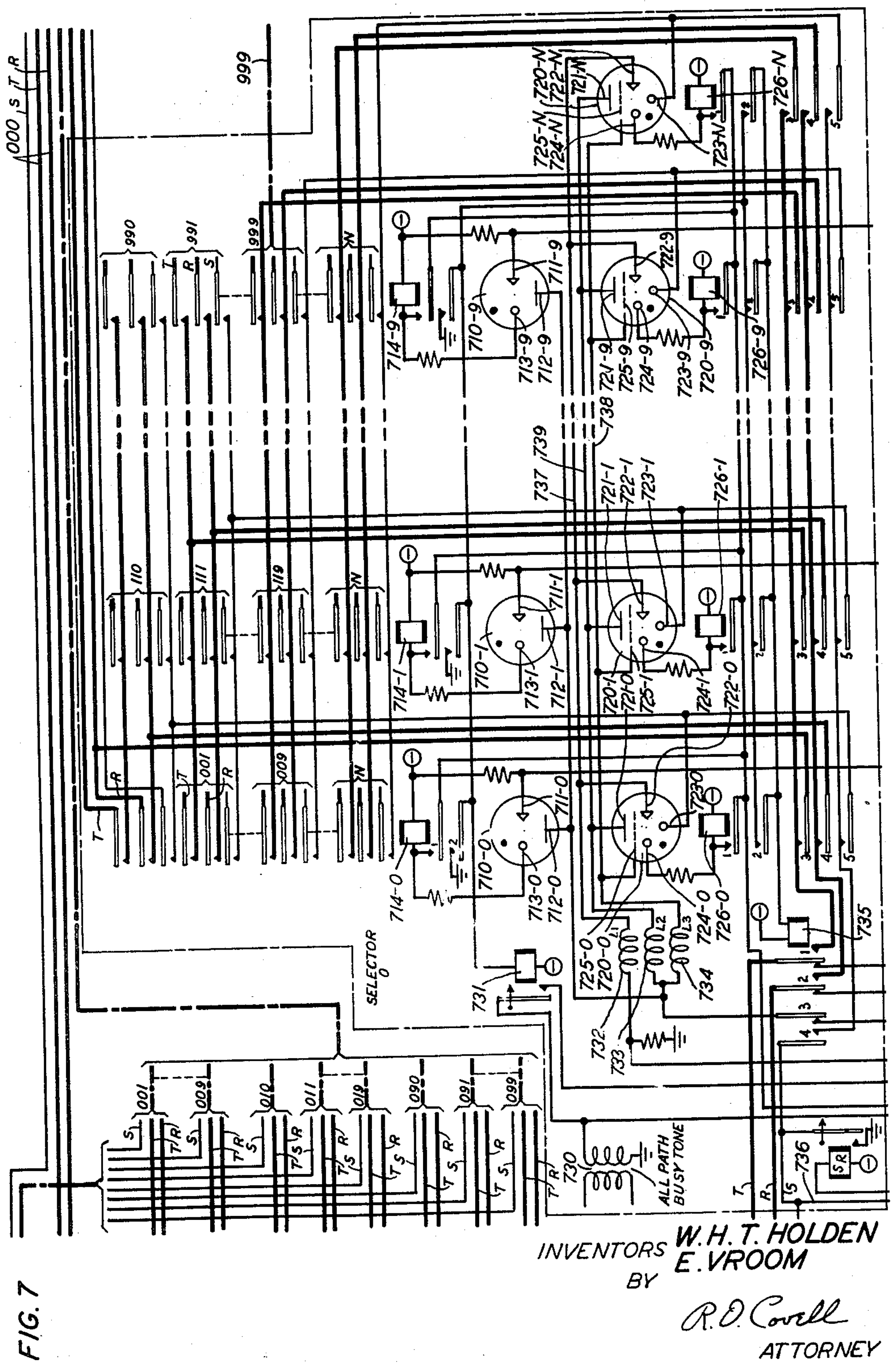
Figs. 7 and 8 illustrate the selector circuits.
Figure 8:
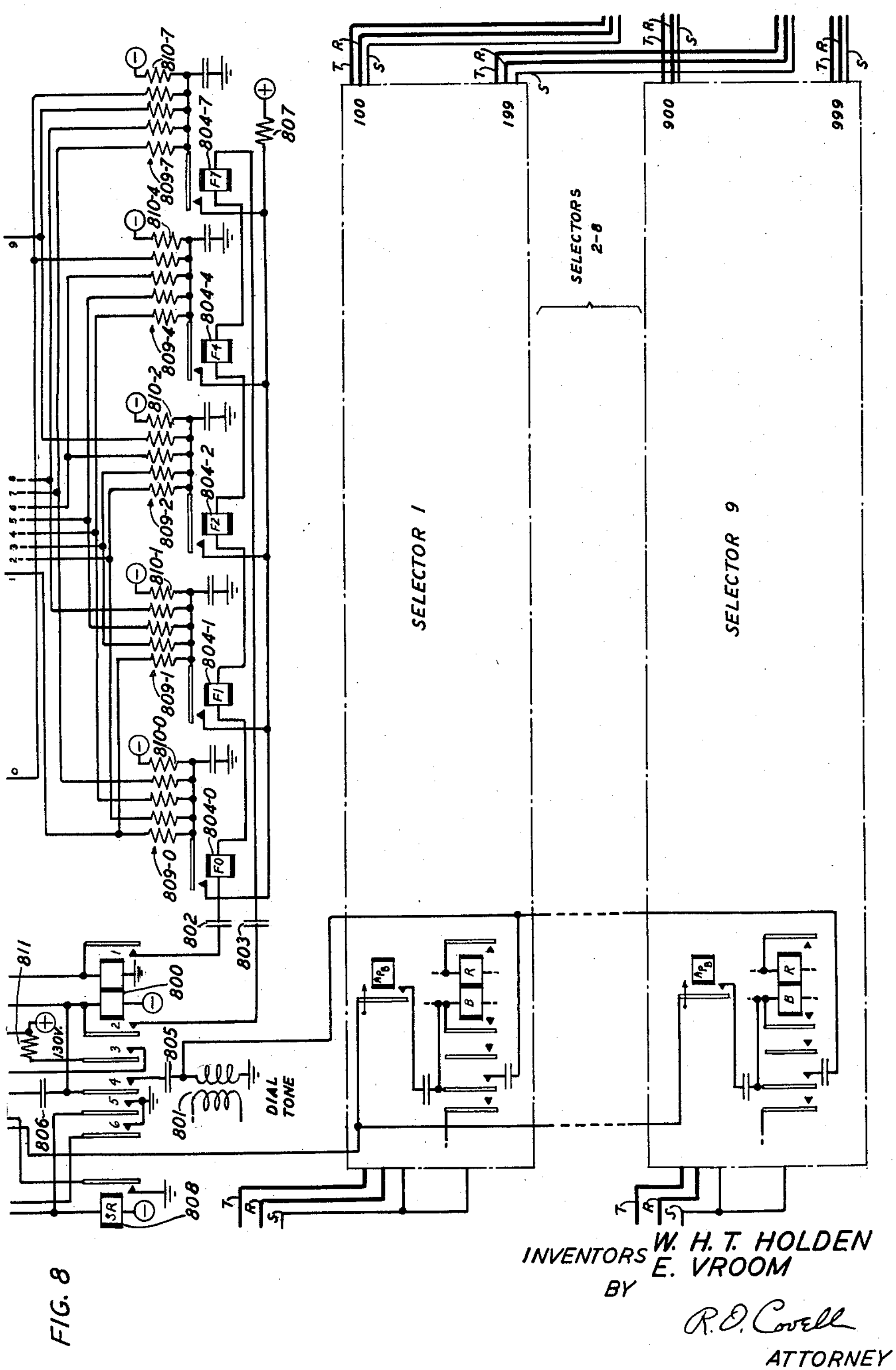

The relay that is associated with the tube that fired operates and connects the group of ten lines in which the calling party is located to the line finder circuit. In line finder 0 this relay would be the relay in the group of relays 512 that is associated with the tube 500 that fired. Tubes such as tubes 520 in line finder 0 are now connected to this group of ten lines by the relay that just operated. One tube out of this group fires and identifies the calling line to the line finder circuit. The relay 524 associated with the tube 520 that fired operates and connects the calling line through to a selector circuit as shown in Figs. 7 and 8.

As the calling party is cut through to the selector circuit, the gas tubes in his line finder circuit extinguish and free the lockout circuit common to all line finders so that other subscribers attempting to initiate calls may be served.

Dial tone is furnished to the calling subscriber as he is cut through to the selector circuit and he is thereby informed that he may commence transmission of digits representing the called station designation. Relays 804, which comprise a two-out-of-five to one-out-of-ten translation circuit, respond to the audio frequency signals generated by the subset of the calling party and cause the tube in the group of tubes 710 to fire which is representative of the first digit transmitted by the calling subscriber. The relay in the group of relays 714 associated with the tube 710 that fires, operates and connects together all the trunk circuits that lead from the selector circuit to the connector circuits serving the called party.

Figure 9:
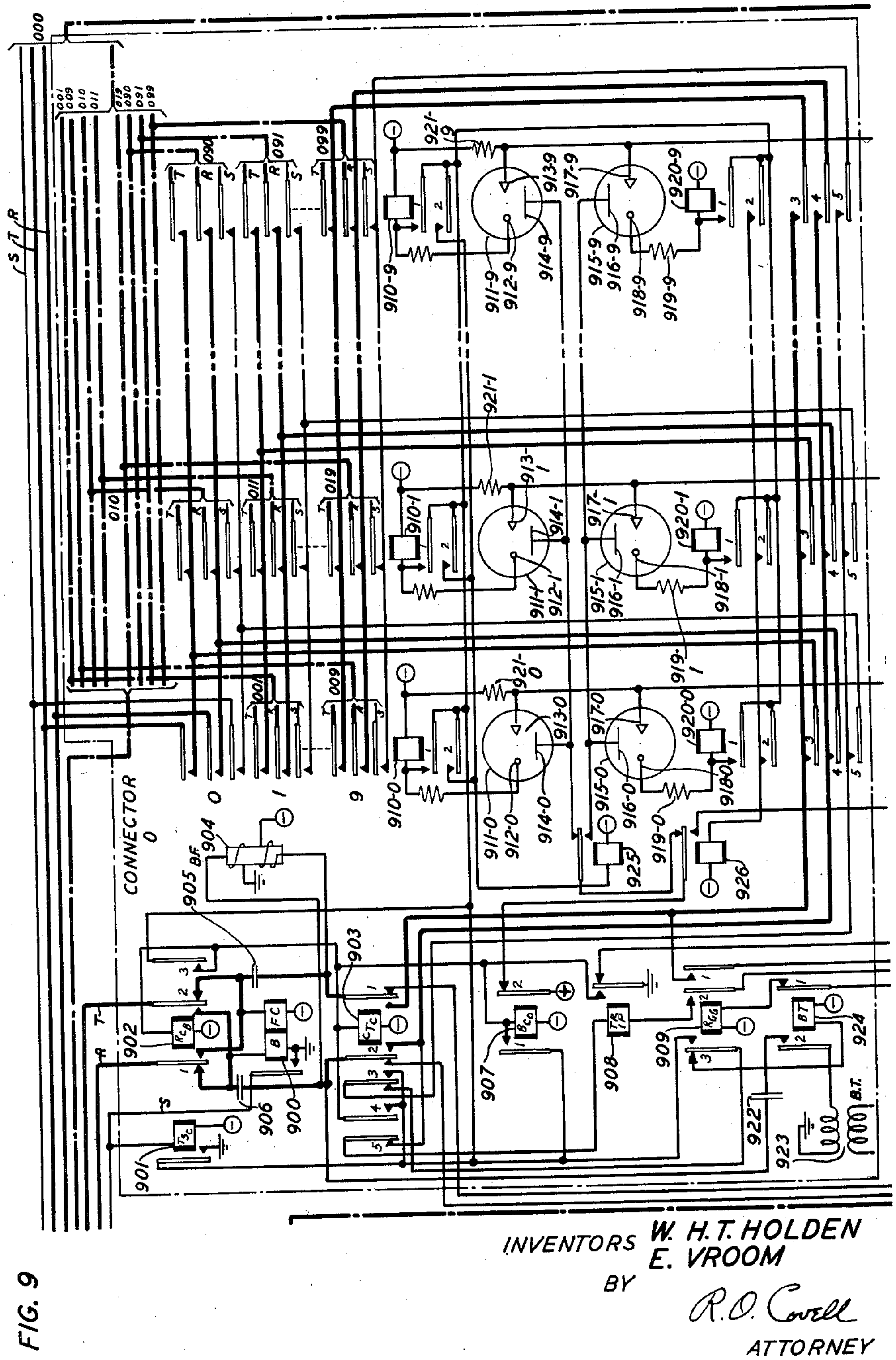
Figs. 9 and 10 illustrate the connector circuits.
Figure 10:
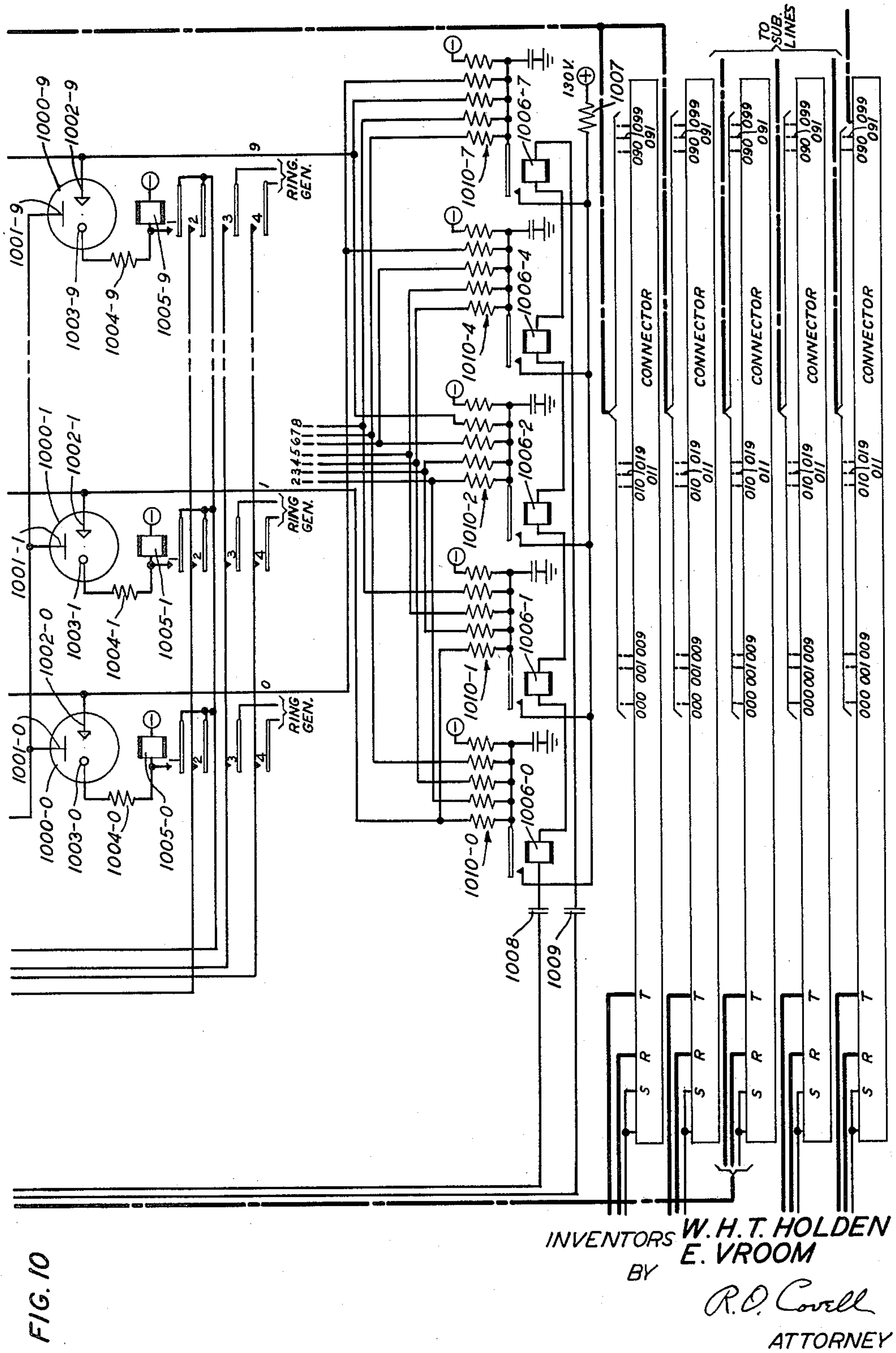

The operation of a relay 714 individually connects each of tubes 720 to one of the trunks leading to the connector circuits. The tubes 720 that are connected to idle trunks now race each other in an attempt to initiate a discharge. The fastest tube in the group wins and in firing prevents all other tubes serving idle trunks from firing by means of the lockout circuit associated therewith. The relay in the group of relays 726 that is associated with the tube that fired operates and connects the calling party through to the trunk that was selected and hence through to the chosen connector circuit shown in Figs. 9 and 10.

The calling party next transmits two more digits representing the directory designation of the called station. A particular tube 911 and a particular relay 910, assuming connector 0 to be the chosen connector, operate in accordance with the second digit transmitted and connect a group of ten lines, in which the called station is one, to the connector circuit. Next a particular tube 915 and a particular relay 920 operate in response to the third digit transmitted by the calling party and connect the called line to the connector circuit.

Since some of the lines may be multiparty lines where coded ringing is necessary, provision is made whereby the calling party causes an extra digit to be transmitted to the central office which, in turn, causes a ringing signal of the proper code to be applied to the called line. This is done by means of tubes 1000 and relays 1005, one of each of which is operated in response to this last digit transmitted. These connect the proper coded ringing generator to the called line. The ringing ceases as the called party answers the call and transmission between the two stations then takes place. The entire system is restored to normal in the usual fashion when the calling party replaces his receiver and breaks his tip and ring circuit.

The call just described was for a called station of the regular type and not one served by a PBX circuit. If the called station is one served by a PBX circuit of the type shown in Fig. 11, the connector circuit seizes the incoming tip, ring and sleeve leads of the PBX circuit, which then commences a hunting action, and connects the connector circuit through to an idle line in the group of lines serving the particular called party. Ringing and answering then takes place in the usual manner.

Returning to Fig. 3, it is seen from the showing of the signaling circuit for subscriber subset 000 that each subset contains ten non-locking keys designated K0 through K9 and five tone generators designated T0, T1, T2, T4 and T7. The keys preferably are of the type that may be depressed and released by the subscriber, and of the type where the normally open contacts associated with each key momentarily close as the key returns to normal after depression by the subscriber. This feature insures that the duration of time during which the contacts are closed will be uniform and not under the direct control of the subscriber.

The number designation on each key represents the digit for which a depression and release of the key by the subscriber causes to be transmitted to the central office equipment intelligence representing said digit.

The drawings disclose a switching system having only 1000 subscribers and therefore no letter designations have been shown associated with each digit key. If the principles of the present invention should be incorporated into a large metropolitan switching system wherein subscriber station designations usually have two or three letters followed by five or four numbers respectively, then some keys would have one or more letters associated therewith, as do the telephone dials in present day large city dial systems.

The designation associated with each tone generator shown for subscriber 000 is indicative of a basic number which the audio frequency signals generated by the tone generator represents. These basic numbers are not directly representative of the digits transmitted by the subscriber to the central office. Rather, the digit transmitted to the central office is formed by the combination of audio frequency signals resulting when any two of the tone generators are operated simultaneously. An example will delineate matters. Digit 1 is transmitted by the combination of audio frequency signals from tone generators T0 and T1. Digit 3 is transmitted by the combination of audio frequency signals from tone generators T1 and T2. Digit 9 is transmitted by the combination of audio frequency signals generated by tone generators T2 and T7, etc. All the keys K0 through K9 have their contacts wired so that when the key is depressed and released, the signals of the two tone generators will be transmitted to the central office whose numerical designations, as shown on Fig. 3, when added together constitute the digit represented by the key just operated and released.

Digit 0 is transmitted to the central office by the combination of audio frequency signals generated by tone generators T4 and T7. Even though the sum of 4 and 7 is 11, this causes no difficulty in the central office because the relay that responds to the combination of these two signals is connected so as to operate the equipment associated with a 0 digit in the central office.

As each digit key is depressed and released by the calling subscriber, battery and ground are applied to the coils of the two tone generators associated with the contacts on the key during the momentary closure of these contacts on the return of the key to its normal position. As battery and ground are applied to the coils of the two tone generators, each assumes a vibratory action, operates as a short-circuiting buzzer, and impresses alternating current signals upon the calling subscriber tip and ring conductors of a frequency determined by the frequency of the vibratory action.

As the coil of a tone generator is energized, the armature contact associated therewith closes and short-circuits the coil thereby causing its release, whereupon the winding is reenergized, the armature is reclosed to the contact and the entire cycle is repeated for the duration of time that the digit key contacts remain closed and apply battery and ground to the tone generators. A resistor is placed in the operating circuit of each tone generator coil so that excessive current will not result when the tone generator armature contact short-circuits its coil.

The frequency of each tone generator is determined by its mechanical construction and the ohmic value of the resistor in series with the winding of the tone generator. The exact value of the frequency of each tone generator is not important, and the only requirements for the value of the frequencies are that they be in the audible range so that they may be readily transmitted over a telephone pair; that they be of sufficiently different frequencies so that they receiving equipment in the central office may properly distinguish between them; and that no frequency be a harmonic or subharmonic of any other frequency.

For the purpose of simplicity in presentation the frequency signaling circuit has been shown to be across the subscriber line at all times. If desired, an additional set of switchhook contacts could be provided so as to disconnect the frequency signaling circuit from the line at all times except when the subscriber is placing a call.

It is desirable that a varistor network or some other suitable unidirectional current device be poled across the subscriber microphone in the subsets so that it will be an effective short circuit across the microphone during the period in which the subscriber is depressing keys representative of the call number desired. This varistor network may be connected in a manner similar to that shown in Patent 2,232,398 issued to A. A. Lundstrom on February 18, 1941. This feature will prevent any noise or other sounds entering the microphone from interfering with or causing a false operation of the tone receiving equipment in the central office. As is described later, battery and ground are reversed to the calling subscriber tip and ring leads when the called party answers. This causes the varistor network or other unidirectional current device to assume a sufficiently high impedance so that it will not interfere with the speech currents generated by the microphone of the calling party.

The subscriber subset and equipment associated therewith is shown only diagrammatically of Fig. 3 inasmuch as the exact physical embodiment is not of great importance. The digit keys and tone generators may be arranged in any manner desired that is suitable for the purpose.

Figure 5:
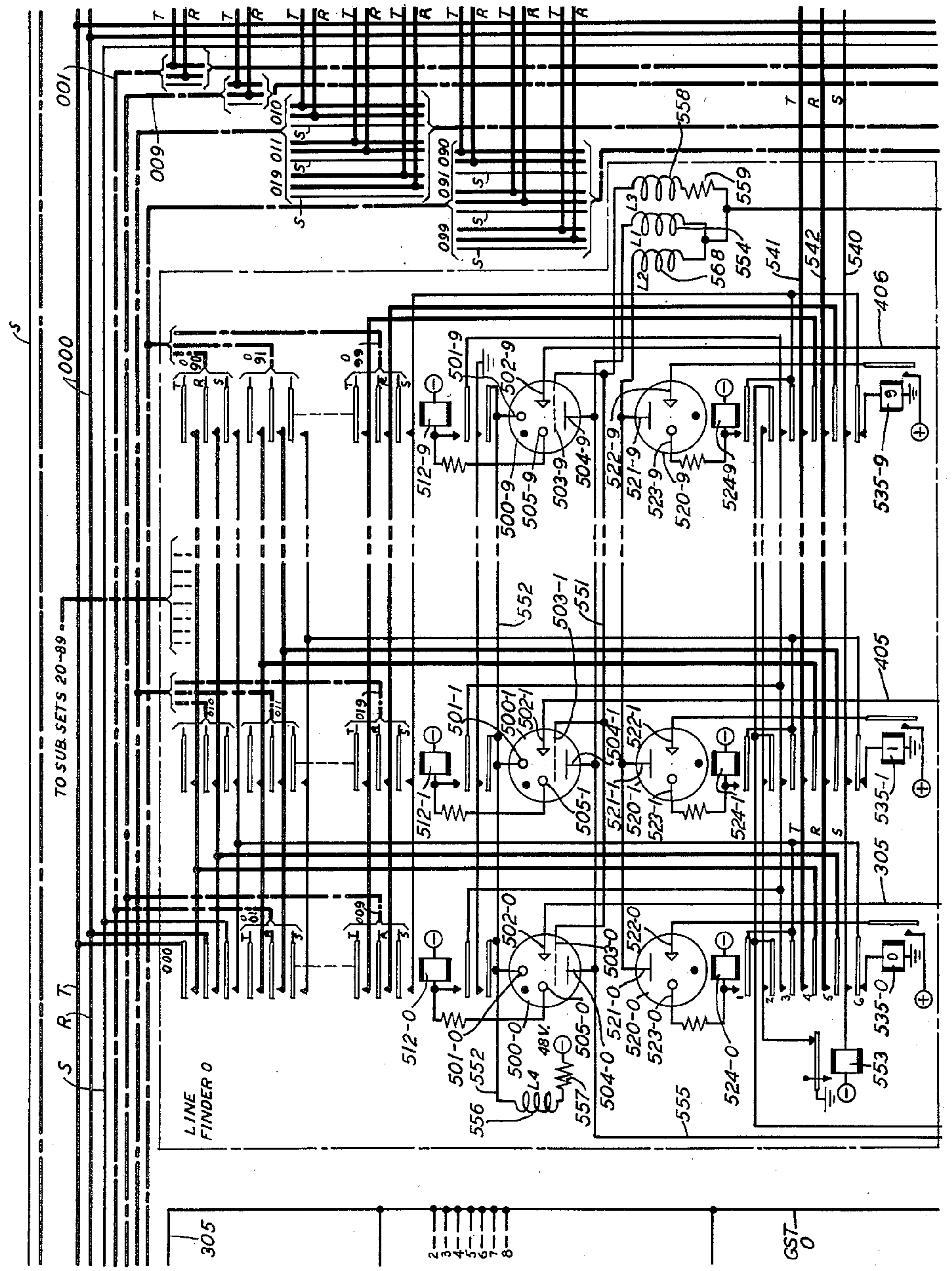
Figs. 5 and 6 illustrate the line finder circuits.

At this time it may be advantageous to examine the structural relationship between parts and the cooperation between elements in the line finder circuits shown in Fig. 5. This explanation will be directed to the line finder shown on Fig. 5 inasmuch as the other line finder circuits are merely shown in diagrammatic form. There are ten tubes designated 500–0 through 500–9 with some of the tubes being represented in diagrammatic form. Individually associated with each of these tubes is a relay in the group of relays 512–0 through 512–9. Each tube in the group of ten tubes 500 is associated with a group of ten subscriber lines. Tube 500–0 is associated with subscribers 000 through 009. Tube 500–1 is associated with subscribers 010 through 019, while tube 500–9 is associated with subscribers 090 through 099.

As a subscriber in any group lifts his subset in an attempt to place a call, relays in his line circuit operate to place a positive 48-volt potential on a conductor exclusive to the group of ten lines in which he is located. These leads are shown as leads 305, 405 and 406 on Figs. 3, 4, 5 and 6. Lead 305 connects the line circuits of the first ten lines to the start anode 502–0 of tube 500–0 in line finder 0 shown in Fig. 5 and also connects the same battery potential to the start anode of each tube corresponding to tube 500–0 in all other line finders associated with subscribers 000 through 009. Likewise, lead 405 connects the line circuits of the second ten lines to the start anode 502–1 of tube 500–1 in line finder 0, and is connected similarly to the tube in each line finder corresponding to tube 500–1 in line finder 0. Likewise, lead 406 connects the line circuits of subscribers 090 through 099 to the start anode 502–9 of tube 500–9 in Fig. 5, and also connects these line circuits to the start anode of the tube corresponding to tube 500–9 in each of the other line finders.

Figure 6:
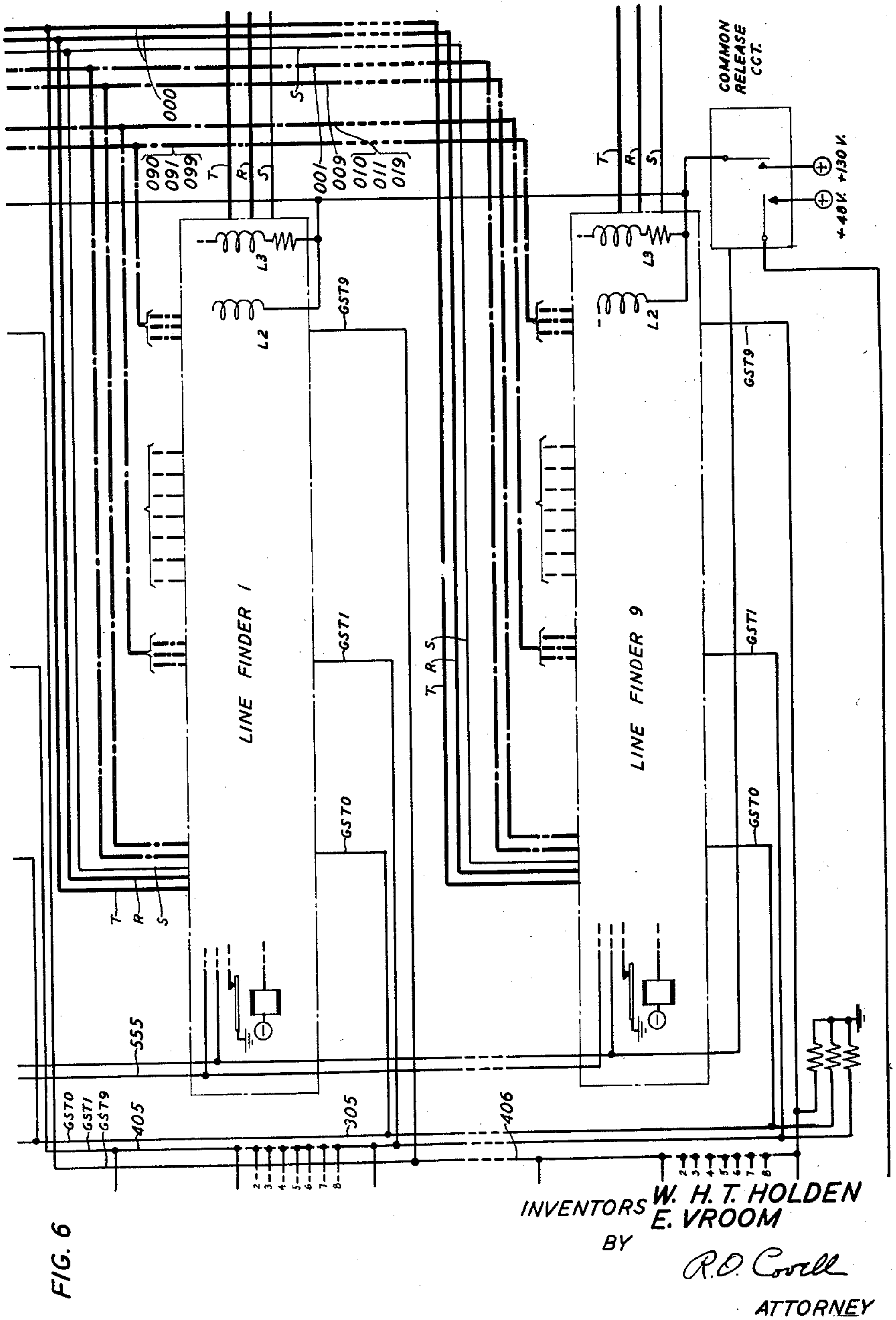

If one subscriber out of the group of 100 subscribers served by the line finders shown on Figs. 5 and 6, attempts to initiate a call, a relay in his line circuit operates and places battery potential on the start anode of the tube associated with his ten lines in each line finder. This causes a tube in one of the line finders to fire. However, if two or more subscribers served by the same group of line finders attempt to initiate a call at the same instant of time, provision is made so that their calls will not interfere with one another, and so that the line finder circuits will serve only one call at a time, and after serving one subscriber will then serve the second subscriber.

Let it be assumed that subscribers 000 and 001 in group 0, and subscriber 011 in group 1 all attempt to place a call at the same time. As subscriber 000 lifts his receiver in an attempt to place a call, switchhook contacts, not shown, operate to close a circuit, also not shown, between his tip and ring leads shown on Fig. 3. The closure of this circuit completes a path to operate line relay 302–0. This path may be traced from a negative battery on one side of the winding of relay 302–0, through the winding of relay 302–0, through contacts 2 of relay 301–0 normal, over the subscriber ring lead, through the subscriber subset circuit, shown herein diagrammatically in the form of a circle designated 000, back over the tip lead, and through contacts 1 of relay 301–0 normal to ground. A similar path may be traced for the circuit of subscribers 001 and 011 when their relays 302–1 and 411–1 operate as they lift their receiver. If any subscriber other than 000, 001 and 011 had attempted to initiate a call at this time, the relay in his line circuit similar to relays 302–0, 302–1 and 411–1 would have operated over a path similar to that just described.

The operation of contacts 2 of line relays 302–0, 302–1 and 411–1 in each subscriber line circuit places a positive 48-volt potential on leads 305 and 405 which, in turn, place a positive 48-volt potential on the start anodes 502–0 and 502–1 of tubes 500–0 and 500–1, respectively, in line finder 0. The positive 48-volt potential on the contacts of these relays is supplied by the common release circuit shown in Fig. 6. The operation of this circuit will be described later. For the present it is sufficient to say that the contacts of this circuit shown in Fig. 6 are closed except when a line finder is about to complete a call. Conductors 305 and 405 also place the same potential on tubes in each line finder corresponding to tube 500–0 and 500–1 in line finder 0. The line finders shown in Fig. 6 are represented only diagrammatically for the sake of simplicity in presentation. However, the equipment and circuits in each of these line finders is identical to that shown in Fig. 5.

It should be noted that lead 305 is also connected to the contacts of line relays 302 of subscribers 002 through 009. Thus, it will have a positive 48-volt potential on it if any one or more of the ten subscribers in the group of subscribers 000 through 009 have closed their switchhook contacts in an attempt to place a call. A positive 48-volt potential on lead 305 informs the idle line finders that one or more subscribers in this group of ten subscribers is attempting to initiate a call. A similar relationship exists between the ten subscribers associated with conductor 405 and the line finders and also between the ten subscribers associated with conductor 406 and the line finders.

Since subscribers 000, 001 and 011 are attempting to initiate a call at this time, the battery potential on leads 305 and 405 inform the line finders that there are one or more subscribers in each of these two groups of ten subscribers currently desirous of initiating a call.

With a positive 48-volt potential on the start anodes of tubes 500–0 and 500–1 in line finders 0, and with the same potential on the corresponding tubes of all other line finders, each of these tubes now attempts to initiate a discharge between the 48-volt positive potential on the start anodes and the start cathodes 501–0 and 501–1, which have a negative 48 volts on them at this time as furnished by inductance 556 and resistor 557. At this time the two tubes in each line finder corresponding to tubes 500–0 and 500–1 in line finder 0 will attempt to initiate a discharge between their start anodes and start cathodes. However, since inductance 556 along with its associated resistor 557 constitutes what is commonly known as a lockout circuit, only the fastest of these two tubes in each line finder will sustain a discharge at this time between the start anode and the start cathode. The instant this discharge is initiated in the fastest tube, the current flow through resistor 557 and inductance 556 lowers the potential on lead 552 sufficiently so that the slower of the two tubes is unable to initiate a discharge between its start anode and its start cathode.

Assume tube 500–0 in line finder 0 to be faster to fire than tube 500–1. The faster tube of the two tubes in each remaining line finder corresponding to tubes 500–0 and 500–1 in line finder 0 will now sustain a discharge between its start anode and its start cathode. In some line finders the tube serving subscriber 011 may be the faster to initiate a discharge, while in other line finders the tube associated with subscribers 000 and 001 may be the fastest to fire and initiate a discharge. After the faster tube in each line finder wins the race against the slower tubes in the same line finder, a new race commences wherein the winning tube in each line finder enters into a race with the winning tube in each other line finder to see which tube is the fastest to complete a discharge across its main gap consisting of the main anode and the main cathode. The process by which a tube eventually sustains a discharge across its main gap is explained below in connection with tube 500–0 in line finder 0.

The instant a discharge is initiated between the start anode 502–0 and the start cathode 501–0, the discharge transfers from the start cathode to the main cathode 505–0 because the potential difference between the start anode 502–0 and the main cathode 505–0 at this time is much greater than that between the start anode and the start cathode 501–0. This greater potential difference between the main cathode and the start anode is caused by the lowered potential on line 552 due to the IR drop in resistance 557 and inductance 556. The current flow from the start anode to the main cathode is insufficient to operate relay 512–0. The discharge again transfers so that it now takes place between the main cathode 505–0 and the screen 503–0 which is supplied with a positive 130-volt potential by inductance 558 and resistance 559, which together comprise a lockout circuit. This transfer takes place because the potential difference between screen 503–0 and the main cathode is greater than that between the main cathode and the start anode.

The purpose of the lockout circuit common to screen elements 503 is to insure that only one tube will be conducting at this time in case the situation about to be discussed should ever occur.

It has been assumed and explained how tube 500–0 is the fastest tube to fire and how the discharge originally initiated between the start anode and the start cathode progresses so that it takes place between the main cathode and the screen element. The next step in the operation of the tube is for the discharge to transfer from the screen to the main anode so that the discharge takes place between the main anode and the main cathode. If it were not for the lockout circuit common to the screen elements of all tubes it would be quite possible for another tube, 500–1, for example, to initiate a discharge between its start anode and start cathode, transfer this discharge to the main cathode and start anode, again transfer the discharge to the main cathode and screen during the period in which tube 500–0, which originally was the faster of the two tubes to discharge, is sustaining a discharge on its screen. Thus while tube 500–0 is attempting to transfer its discharge from the screen to the main anode, tube 500–1 would have caught up with tube 500–0 and similarly transfer its discharge from its screen to its main anode. It is for this reason that the lockout circuit common to the screen elements is provided.

The current between the main cathode 505–0 and screen 503–0 is also insufficient to operate relay 512–0. The discharge again transfers so that it takes place between the main cathode 505–0 and the main anode 504–0 which is supplied with a positive potential by lockout inductance 554. This transfer takes place because the potential between the main anode and the main cathode is greater than that between the main cathode and the screen. This lesser potential between the screen and main cathode is caused by the IR drop through inductance 558 and resistance 559. The current between the main cathode 505–0 and the main anode 504–0 is sufficient to operate relay 512–0.

The lockout circuit comprising inductance 554 insures that only one tube in the horizontal row of tubes 500–0 through 500–9 in line finder 0 can fire at one time across its main gap as well as insuring that only one tube, similar to any of tubes 500, in all the line finders can fire across its main gap at this time. The instant one tube in any line finder fires across its main gap, the potential supplied to lead 555 by inductance 554 is sufficiently reduced so that no tube in the same or in any other line finder will be able to fire across its main gap at this time.

As is more fully explained later, the tubes in the other line finders which have sustained a discharge in an attempt to serve this call have the discharge therein extinguished as soon as line finder 0 serves the present call so that these tubes may be available to serve other subscribers now waiting to place a call.

When any tube in the group of tubes 500–0 through 500–9 fires across its main gap, its associated relay in the group of relays 512–0 through 512–9 operates and in doing so connects the tip, ring and sleeve leads of the ten subscribers in the group of subscribers served by the fired tube to the line finder circuit. Since the three lockout circuits consisting of inductances 556, 558 and 554 prevent more than one tube 500 in all line finders combined from operating at any given instant of time, even if subscribers in more than one group of ten lines are attempting to initiate a call simultaneously, it may be assumed that the tube 500–0 in line finder 0, which serves subscribers 000 through 009, is the fastest to operate and is therefore conducting at this time, and thereby indicating that one or more subscribers in its group of ten lines is attempting to initiate a call. Relay 512–0 operates when tube 500–0 fires and connects the tip, ring and sleeve leads of the ten subscribers which it serves to the line finder circuit. Since tube 500–0, which serves calling subscribers 000 and 001 has fired first, calling subscriber 011 will have to wait until the line finder has served one of these subscribers before he will have a chance to be served.

It has been assumed that subscribers 000 and 001 both of whom are served by tube 500–0, are both attempting to place a call. Since subscribers 000 and 001 are attempting to initiate a call simultaneously, their line relays 302–0 and 302–1, respectively, are operated at this time, and in doing so they connect a negative 48-volt battery through the winding of relays 301–0 and 301–1 to the sleeve lead of each subscriber. This potential on sleeve lead of each subscriber that is attempting to place a call, operates relays 535–0 and 535–1 as soon as relay 512–0 operates and connects the sleeve leads of the calling subscribers in group 0 to these two relays. If any subscriber in group 0, in addition to subscribers 000 and 001, had attempted to place a call at this time, his associated relay in the group of relays 535 would likewise be operated by the negative battery on his sleeve lead.

The operation of relays 535–0 and 535–1 places a suitable positive potential on the start anodes 522–0 and 522–1 of tubes 520–0 and 520–1, respectively. Each of these tubes at this time sustains a discharge between its start anode and its cathode, 523–0 and 523–1. The current in this gap is insufficient to operate the relay 524 associated with each tube. Each tube next attempts to transfer the discharge from the start anode to the main anode 521–0 and 521–1. However, one tube of the two, or more than two if more than two subscribers in group 0 are now attempting to place a call, that is now sustaining a discharge on its start anode will be faster to operate than the rest and will transfer its discharge from the start anode to the main anode. As soon as this fastest tube has sustained a discharge across its main gap, the voltage through inductance 568 will fall to a sufficiently low value so that the other tube 520 which is attempting to transfer its discharge to its main anodes will be prevented from doing so.

If tube 520–0 may be assumed to be the fastest tube in the group of tubes 520, then the current through its main gap will operate relay 524–0. Relay 524–0 in operating connects the tip, ring and sleeve lead of subscriber 000 through the selector circuit shown on Fig. 7. Subscriber 001, who is served by the slower tube 520–1 and who also is now attempting to place a call will have his call served by one of the other line finders after this line finder has connected subscriber 000 through to the connector. Subscriber 011, who is served by the slower tube 500–1, will also have to wait until the line finder serves the call for subscriber 000.

The lockout circuits comprising inductances 554, 556, 558 and 568 as shown on Fig. 5 have only been described in terms of how they operate and in what results their operation causes. For a more thorough description of lockout circuits, reference is made to Patent No. 2,594,389 granted to E. Bruce on April 29, 1952. Reference is also made to patent No. 2,350,888 granted to N. I. Hall on June 6, 1944, for a more thorough description of the operation of tubes 500 and the operation of the lockout circuits individually associated therewith.

The operation of relay 524–0 in the line finder connects the tip, ring and sleeve leads of subscriber 000 through to the selector circuit shown in Figs. 7 and 8. The operation of contacts 2 of relay 524–0 extends the ground on the contacts of relay 553 through to common release circuit shown on Fig. 6. This ground causes the common release circuit to operate and open the contacts shown associated therewith. The opening of these contacts removes the positive 48-volt and the positive 130-volt potentials from the line finder circuits which causes the operated tubes 500–0 and 520–0 to extinguish by removing the potentials from elements 502–0, 503–0, 504–0 and 521–0. Relays 512–0 and 524–0 remain operated from a ground on sleeve lead 540 as supplied by the selector circuit. During the time in which the common release circuit is held operated by the ground supplied by relay 553, all the line finders are held inoperative since the operating potentials are removed from all the gas tubes. This inoperative time is held to a minimum due to the fact that relay 553–0 operates shortly after relay 524–0 does and allows the common release circuit to restore to normal by removing its operating ground. All other line finders have similar circuits so that the operation of their relays corresponding to the relays 512 and the relay 553 of line finder 0 will operate and release the common release circuit in a similar manner. The common release circuit is shown herein in diagrammatic form and may be of any type that is suitable for the purpose.

The calling subscriber tip and ring leads, 541 and 542, are connected through contacts 1 and 2 of relay 735 unoperated, to the windings of relay 800 which now operates. The operation of relay 800 connects the incoming tip and ring leads through to the frequency selective relays 804 whose operation will later be described. Contacts 5 of relay 800 also apply ground to the calling subscriber's sleeve lead. This ground provides a holding path for relays 512–0 and 524–0 over an obvious path. This ground on the incoming sleeve lead 540 also operates relay 553 in the line finder circuit as previously described.

The ground on sleeve lead 540 is sent back through the contacts of operated relays 524–0 and 512–0 to the subscriber line circuit in which relay 301–0 is operated by this sleeve ground. As relay 301–0 operates, its contacts 2 cause relay 302–0 to release. Relay 301–0 in operating, prepares a holding circuit for itself over its contacts 3 so that it remains operated to the sleeve ground when relay 302–0 releases. The opening of contacts 1 and 2 of relay 301–0 removes one source of battery and ground from the calling subscriber tip and ring conductors.

The release of relay 302–0 causes its contacts 1 to open the operating circuit for relay 301–0 and causes its contacts 2 to remove the positive 48-volt potential from group start lead 305.

As soon as the ground from relay 800 is placed on sleeve lead 540, thereby operating relay 553, which releases the common release circuit, the other line finders may function to serve other subscribers attempting to initiate calls at this time. Thus, if any other subscriber in group 0 is attempting to place a call at this time, or if a subscriber in any other group is attempting to place a call at this time, the operation of his associated line circuit places a positive 48-volt potential on his related group start lead in the group of leads 305, 306 and 307, whereupon the tubes in other line finders corresponding to tubes 500 and 520 in line finder 0 will operate and connect the next calling subscriber through to a selector.

The operation of contacts 3 of relay 800 connects a 130-volt positive potential through resistor 811 to lockout circuit 732 which, in turn, supplies this operating potential to the start anodes 722 of all tubes 720. No tube 720 operates at this time for reasons that will be described later. The operation of relay 800 also connects dial tone as supplied by transformer 801 through condenser 805, through contacts 4 of relay 800 operated, through contacts 2 of relay 735 normal, to the incoming ring lead 542. The application of dial tone to the calling subscriber ring lead 542 notifies the subscriber that he may commence signaling the called party's number by depressing the proper digit keys on his subset. None of relays 804 are responsive to the frequency of the dial tone signal.

The operation of contacts 6 of relay 800 closes an operating circuit for slow release relay 736 whose contacts prepare a holding ground for the operated line finder relays. Contacts 5 of relay 800 operated operate relay 808 which prepares a holding ground for various relays in the selector circuit.

As the calling subscriber depresses and releases the digit keys in his subset, alternating currents are applied to his tip and ring leads containing frequencies indicative of the telephone number of the called part. Assuming that the calling party wishes to converse with subscriber 009, he will first depress and release the digit key K0 on his subset. As digit key K0 is returning to normal, the contacts associated therewith momentarily close and apply battery and ground potential from relay 800 to tone generators T7 and T4 which commence a vibratory action and impress their resonant frequencies upon the calling subscriber tip and ring leads. These frequencies are transmitted through the line finder circuit and over leads 541 and 542, through contacts 1 and 2 of relay 800 operated, through condensers 802 and 803 to the series circuit comprising relays 804–0, 804–1, 804–2, 804–4 and 804–7. Each of relays 804 is designed so that it will operate only when an alternating current of a particular frequency is applied to it. The particular frequency that operates each relay 804 is chosen so that it is a frequency generated by a related one of the tone generators in a subscriber subset. For example, relay 804–0 is operated by a current of a frequency generated by tone generator T0, relay 804–1 is operated by a current of a frequency generated by tone generator T1. A similar relationship exists betwen the remaining relays 804 and the remaining tone generators.

Since it was assumed that the calling subscriber first depressed and released his digit key K0 in an attempt to connect himself with subscriber 009, the energization of tone generators T4 and T7 applies alternating currents to the tip and ring leads which in turn causes relays 804–4 and 804–7 to operate. The remaining relays 804 do not respond to the frequencies applied to the tip and ring at this time.

The operation of relays 804–4 and 804–7 causes a positive potential from resistor 807 to be applied through resistors 809 to lead 0, which in turn applies this positive potential to the start anode 711–0 of gas tube 710–0.

An analysis of the circuits associated with the five resistors 809 connected to the contacts of each relay 804 will show that a positive potential is applied to one and only one lead out of the ten leads 0 through 9 shown on Fig. 8 when any two relays 804 are simultaneously operated. When no relays 804 are operated the start anodes of tubes 710 have a negative potential placed thereon by a circuit including resistors 809 and 810 in series with a negative source of potential. The operation of only relay 804 will cause none of leads 0 through 9 to assume a positive potential. An example will delineate matters. Let it be assumed that only relay 804–7 is operated. Resistor 807 being of much lower resistance than resistor 810 will apply a positive potential to resistors 809 which in turn attempt to apply this positive potential to the start anodes of all tubes 710. No tubes 710 will fire now because the other resistors 809 associated with each of conductors 0 through 9 is connected through its associated resistor 810 to a negative source of potentials. This causes each of conductors 0 through 9 to assume a potential that is not sufficiently positive to initiate a discharge within the tubes 710. Assuming relay 804–7 only to be operated and considering the circuit for tube 710–0, it is seen how the start anode of this tube is approximately mid-point in series circuit comprising resistor 807, the contacts of relay 804–7, a resistor 809 associated with relay 804–7, a resistor 809 associated with relay 804–4, and resistor 810 associated with relay 804–4, to a negative source of potential. This series circuit prevents the potential on the start anode from rising to a sufficiently high positive value to fire the tube unless both relays associated with the tube are operated. Considering the same situation as before, if relay 804–4 and relay 804–7 should be operated simultaneously, the start anode of tube 710–0 will rise to the value of positive potential sufficient to fire the tube. The same considerations which prevented any of tubes 710 from firing when only one of relays 804 is operated also prevent any but the desired tube of tubes 710 from firing when any selected two of relays 804 are operated.

The relays 804, the resistors 809, the resistors 810, the resistors 807, and leads 0 through 9 comprise what is commonly known as a two-out-of-five translation circuit. This type of circuit is shown in Patent 2,317,471 granted to L. A. Meacham on April 27, 1943.

Tube 710–0 initiates a discharge between its start anode 711–0 and its cathode 713–0 as lead 0 applies a positive potential to the start anode. The current flowing between elements 711–0 and 713–0 of the tube is insufficient to operate relay 714–0. As soon as the above-mentioned discharge is initiated, it transfers from the start anode to the main anode 712–0 which causes the current through the tube to increase and thereby operate relay 714–0. The operation of relay 714–0 closes a holding circuit for itself through its contacts 1 to the ground on the contacts of relay 808 operated. This circuit also causes tube 710–0 to be partially short-circuited so that it may or may not extinguish at this time depending on the characteristics of each individual tube. It is functionally unimportant whether the tube extinguishes at this time since if it does not extinguish now it will extinguish at a later time.

The hypothetical call described herein has assumed the called party to be subscriber 009. Should the number designation of the called party be a first digit other than 0, the calling subscriber would have depressed a digit key other than 0 which would have operated a different pair of relays other than 804–0 and 804–7. This would, in turn, have effected the operation of a tube other than 710–0 in the group of tubes 710.

As previously explained, the operation of relay 714–0 closes a holding circuit for itself over its contacts 1 to ground on the contacts of relay 808 operated. The operation of contacts 2 of relay 714–0 energizes slow operate relay 731 which closes a path from the all paths busy tone generator 730 through the contacts of relay 731, through condenser 806, to the ring lead of the calling subscriber. This circuit applies a busy tone to the calling subscriber line. In case the call is blocked at this point the calling subscriber will hear the tone and replace his subset. If the call is not blocked at this point by all trunks being busy, one tube out of the group of tubes 720 will operate and connect the calling party to a connector before slow operate relay 731 has had time to operate.

The operation of relay 714–0 closes a group of contacts which connect to all of the outgoing trunks leading to the connector circuits that are available upon the signaling of a 0 for the first digit. The total number of trunks available leading to the connector circuits may be greater or less than 10, if desired, and may be designated by the number N. The closure of relay 714–0, among other things, individually connects the sleeve lead of each of the outgoing trunks to a start cathode of one of the tubes 720. An examination of Fig. 7 will show that at this time tubes 720–0, 720–1 through 720–9 through 720–N are individually related and connected to outgoing trunks 000, 001, through 009 through N, respectively. The sleeve leads of the idle outgoing trunks connect a negative battery to the start cathodes of their related tubes 720, while the busy outgoing trunks apply ground from their sleeve to the start cathodes of their related tubes 720.

All tubes 720 having a negative battery applied to their start cathodes at this time tend to initiate a discharge between their start cathodes 723 and start anodes 722. One tube out of all the tubes 720 that are connected to an idle trunk will be the fastest to operate. It, and it alone, will sustain a discharge from its start anode and start cathode. The instant the discharge is initiated in the fastest tube, the current through the discharge gap lowers the potential on conductor 737 which normally supplies a positive 130-volt potential to the start anodes of all tubes 720. This lowering of potential on conductor 737 is caused by the potential drop in lockout inductance 732 due to the current in the discharge gap at this time. The potential on conductor 737 falls to a suitable low level once the fastest of tubes 720 initiates a discharge between its start anode and start cathode so that the potential difference now existing between the start anodes and start cathodes of the tubes 720 is insufficient to initiate a discharge in any of the other tubes.

Let it be assumed that tube 720–0 is the fastest tube connected to an idle trunk in the group of tubes 720. Therefore, this tube will be the first to sustain a discharge between its start anode and start cathode as soon as a relay 714–0 is operated. The assumption that tube 720–0 fires at this time also requires the assumption that tube 720–0 is connected to an idle trunk. If the trunk to which tube 720–0 is connected were busy at this time, the fastest one to operate of the remaining tubes 720 would sustain a discharge at this time.

Once the discharge is initiated between the start cathode and start anode of tube 720–0 it will transfer from the start cathode to the main cathode 724–0. The current now flowing between the start anode 722–0 and the main cathode 724–0 is insufficient to operate relay 726–0. Next, the discharge transfers from the start anode to the screen 725–0. The current flowing between the screen and the main cathode is also insufficient to operate relay 726–0. Screen 725–0 of tube 720–0 is connected to conductor 738 which supplies potential through lockout inductance 734 to the screens of all tubes 720. As has been explained before with reference to the lockout circuits shown on Fig. 5, lockout inductance 734 insures that only one tube at a time will be able to sustain a discharge between its screen and main cathode.

Next, the discharge transfers from the screen to the main anode 721–0 and the current across the main gap of the tube operates relay 726–0. The main anodes of all tubes 720 are supplied with potential through lockout inductance 733 over conductor 739. This inductance insures that only one tube out of all the tubes 720 can sustain a discharge across its main gap at any one instant of time. Lockout inductances 732, 733 and 734 associated with tubes 720 all work in a similar fashion to the lockout inductances associated with tubes 500, shown on Fig. 5. Since the lockout circuits associated with tubes 500 have been fully described, it is not believed necessary to repeat a description of the lockout circuits associated with tubes 720.

The operation of contacts 1 of relay 726–0 closes a holding circuit for relay 726–0 to a ground supplied by relay 808 operated. Contacts 3, 4 and 5 of relay 726–0 operated prepare a path to connect the incoming tip, ring and sleeve leads to the connector circuit. Relay 726–0 in operating also closes a path over its contacts 2 to operate relay 735.

Contacts 3 of relay 735 operated break the positive 130-volt supply for gas tubes 710–0 and 720–0 which now extinguish if they did not extinguish at the time their associated relay operated and partially short-circuited them. Relays 714–0 and 726–0 remain operated over their previously described holding paths after their associated gas tubes have extinguished. Contacts 1 and 2 of relay 735 operated remove the incoming tip and ring leads from the windings of relay 800 which releases, and connects the incoming tip, ring and sleeve leads through to the connector circuit.

Relay 900 in the connector circuit operates when relay 735 in the selector circuit operates to cut through the tip and ring leads of the calling party to the windings of relay 900. The contacts of relay 900 operated place a ground on the incoming sleeve lead, which ground holds operated the operated relays in the line finder and connector circuits.

Relays 736 and 808 in the selector circuit, being of the slow release type, do not release during the small interval of time existing between the operation of relay 735 and relay 900. During this small interval of time relays 736 and 808 remain operated and supply holding ground to the line finder and selector circuits respectively until relay 900 in the connector circuit operates and applies its own holding ground to the incoming sleeve lead.

Relay 735 operated holds operated over contacts 2 of relay 726–0 operated and over contacts 2 of relay 714–0 operated to ground.

Relay 900 in operating operates relay 901 which furnishes a holding ground for many circuits in the connector which are described later.

The tip and ring conductors of the calling party are now connected over an alternating current path to the frequency responsive circuit in the connector comprising relays 1006. On the ring conductor this path runs from contacts 1 of relay 902 normal, through condenser 906, through contacts 2 of relay 903 normal, through condenser 1009, to relay 1006–7. On the tip conductor side this path runs from contacts 2 of relay 902 normal, through condenser 905, through contacts 1 of relay 903 normal, through condenser 1008 to relay 1006–0.

The frequency responsive circuit comprising relays 1006 is essentially identical with the frequency responsive circuit in the selector shown on Fig. 8 and comprising relays 804. Since the operation of relays 804 along with their associated circuits has been fully described, it is not believed necessary to describe in detail the operation of relays 1006.

It has been assumed that the calling subscriber 000 desires to converse with subscriber 009. The selector circuit responded to the first 0 digit sent out by the calling party and connected his tip, ring and sleeve conductors through to a connector that serves the particular group of 100 lines in which subscriber 009 is located. It has been assumed for simplicity in presentation that the selector seizes the connector circuit shown in Fig. 9 and in the upper part of Fig. 10. However the call would proceed in a similar manner if the selector had seized any connector that serves the group of lines in which the calling party is located. Other connectors are shown diagrammatically in the lower half of Fig. 10.

As the calling party depresses and releases the digit keys, the tone generators in his subset send forth frequencies representative of a 0 for the second digit; relays 1006–4 and 1006–7 respond to the frequencies generated upon the transmission of a 0 digit and operate. Relays 1006–4 and 1006–7 in operating cause a positive potential from resistor 1007, through the contacts of each operated relay 1006, and through the resistors 1010 associated therewith, to be applied to the start anode 913–0 of gas tube 911–0, the start anode 917–0 of tube 915–0 and the start anode 1002–0 of tube 1000–0. This positive potential causes a discharge to be initiated between the start anode and cathode of each of the above-mentioned tubes.

The discharge between the start anode and cathode of tube 911–0 immediately transfers to the main anode 914–0 which is supplied with a positive potential over a path including the contacts of relay 925 normal, contacts of relay 926 normal, and contacts 2 of relay 907 normal. The discharge initiated in tubes 915–0 and 1000–0 does not transfer to the main anodes inasmuch as a positive potential is not connected to the main anode of these tubes at this time. The release of relays 1006–4 and 1006–7 upon the termination of the transmission of the digit 0 removes the positive potential from the start anodes of tubes 915–0 and tubes 1000–0 and thereby extinguishes the discharge previously initiated therein.

Since the number of the called party has been assumed to be 009, the calling party caused a 0 to be transmitted for the second digit which caused tube 911–0 to fire. If the calling party had transmitted any other digit than 0 for the second digit, the appropriate tube in group of tubes 911 would have fired that represents the digit the calling party transmitted.

Tube 911–0 in firing operates relay 910–0 which locks over its contacts 1 to a ground supplied by relay 901 operated. Contacts 2 of relay 910-0 operated extends the above-mentioned ground to relay 925 which operates. Relay 925 in operating removes the positive potential from the main anodes of tubes 911 and applies this potential to the main anodes of tubes 915. Tube 911–0 extinguished at this time, but relay 910–0 holds operated over the path previously described.

Relay 910–0 in operating connects the group of ten lines in which the called subscriber line is located to the connector circuit.

Since the called party's designation is 009, the calling party will cause a 9 to be transmitted for the next digit. The transmission of the digit 9 operates relays 1006–2 and 1006–7 which place a positive potential on the start anode 913–9 of tube 911–9, the start anode 917–9 of tube 915–9, and the start anode 1002–9 of tube 1000–9.

This positive potential on the start anodes causes a discharge to be initiated between the start anode and cathode in each of the above-mentioned tubes. The discharge in tube 915–9 immediately transfers to the main anode 916–9 which is supplied by the contacts of relay 925 operated, the contacts of relays 926 unoperated, and contacts 2 of relay 907 normal, with a positive source of potential. The discharges initiated in tubes 911–9 and 1000–9 do not transfer to the main anodes because the main anodes have no potential on them at this time. The discharges initiated in tubes 911–9 and 1000–9 are extinguished when relays 1006–7 and 1006–2 release and remove the positive potential from their start anodes.

Relay 920–9 operates in response to the firing of tube 915–9 across its main gap and closes a holding circuit for itself over its contacts 1 to a ground supplied by the relay 901 operated. The closure of contacts 2 of relay 920–9 extends this ground to the winding of relay 926 which operates. Relay 926 in operating removes the positive potential from the main anodes of tubes 915 and applies this potential to the main anodes of tubes 1000. The discharge in tube 915–9 extinguishes as relay 920–9 operates and as the potential is removed from its main anode by the operation of relay 926. The extinguishment of this discharge in tube 915–9 does not cause relay 920–9 to release since it remains locked over the holding path previously described.

The operation of contacts 3, 4 and 5 of relay 920–9 extend the tip, ring and sleeve conductors of the called party through to the contacts of relay 903.

A busy test of the called line is made at this time. If the called subscriber line is busy, a ground on the sleeve conductor of the called party will be extended through contacts 5 of relay 920–9 operated, through contacts 3 of relay 903 normal, and through contacts 3 of relay 909 normal to relay 924 which operates. Contacts 1 of relay 924 operated prevent relay 909 from operating and applying ringing potential to the called line in case the calling party should attempt to proceed with the call. Contacts 2 of relay 924 operated apply busy tone from busy tone generator 923 through condenser 922, through condenser 906, to the ring lead of the calling party. Upon hearing the busy tone the calling party will hang up and the circuit will restore to normal.

If the called line is idle the calling party will not hear a busy tone at this time and will proceed with the call. Tubes 1000 and relays 1005 and the circuits associated therewith are provided in order to illustrate circuit features necessary if the called party is on a multiparty line rather than on a single party line. If the called party were on a single party line the above-mentioned tubes 1000 and relays 1005 would not be necessary, and the ringing of the called party could commence as soon as any relay in the group of relays 920 had operated to connect the tip, ring and sleeve conductors of the called party through to relay 903. This disclosure assumes that some subscribers are on a multiparty line and therefore tubes 1000 and relays 1005 are provided in order to provide selective ringing of such parties. With this type of circuit it is necessary for the calling party to transmit an extra digit to the receiving equipment in the central office for the purpose of selectively operating ringing equipment which will apply the proper ringing signals to the called line so that only the wanted party will answer.

Let it be assumed that the transmission of the digit 1 will cause properly coded ringing signals to be applied to the called line. As the calling subscriber depresses and releases his digit keys, relays 1006–0 and 1006–1 operate to place a positive potential on the start anodes of tubes 911–1, 915–1, and 1000–1 which causes a discharge to be initiated between the start anodes and the cathodes in these tubes. The discharge initiated in tube 1000–1 immediately transfers to the main anode which is supplied with a positive potential by the contacts of relay 926 operated and relay 907 normal. The discharges initiated between the start anode and cathode in the other two tubes do not transfer since the main anodes of these two tubes are not supplied with a positive potential at this time. The discharge in these two tubes is extinguished when relays 1006–0 and 1006–1 release and thereby remove the positive potential from the start anodes of these two tubes.

Relay 1005–1 operates and locks over its contacts 1 to a ground supplied by the contacts of relay 908 normal as tube 1000–5 fires. This ground partially short-circuits tube 1000–1 which may or may not cause the discharge therein to be extinguished at this time. Contacts 2 of relay 1005–1 operated supplies a ground through the contacts of relay 924 normal to relay 909 which now operates. Contacts 3 of relay 909 operated remove the negative potential supplied through the winding of relay 924 to the called party's sleeve lead and in turn applies a ground potential from relay 901 operated to this sleeve lead and thereby makes the line busy to other connector circuits. Contacts 3 and 4 of relay 1005–1 operated connect the coded ringing generator associated with this relay to contacts 1 and 2 of relay 909.

Contacts 1 of relay 909 operated connect one side of the coded ringing voltage to the tip conductor of the called party. The other side of the coded ringing voltage is connected through contacts 2 of relay 909 operated, through the winding of relay 908, through contacts 5 of relay 903 normal, to the ring lead of the called party. The coded ringing potential causes a signal to be impressed on the called line which will energize the ringer in the called party's subset. No further circuit operations are initiated until the called party answers the call by lifting the receiver of his subset.

As the called party lifts his receiver when answering the call, the resulting short circuit across his ringer increases the ringing current to a value that operates relay 908 which is in series with the ringing current supplied to the called line. Relay 908 operated removes ground from contacts 1 and 2 of relay 1005–1 operated which opens the holding circuit for this relay and causes it to release. The removal of the ground from contacts 2 of relay 1005–1 also causes relay 909 to release which in turn removes the ringing current from the line. Relay 908 operated operates relay 907 over an obvious path. Contacts 1 of relay 907 operated provide a holding path for the relay to a ground supplied by relay 901 operated. Contacts 2 of relay 907 operated removes the positive potential from the anode of tube 1000–1 which causes the discharge therein to extinguish if it did not already extinguish when relay 1005–1 operated.

Relay 908 in operating also causes relay 903 to operate over an obvious path. Relay 903 operated locks over its contacts 4 to a ground supplied by relay 901 operted. Contacts 1 and 2 of relay 903 operated disconnect the incoming tip and ring leads from the frequency responsive relays 1006 and connect them through to the called party line. Contacts 3 of relay 903 operated maintain the ground on the outgoing sleeve lead so as to keep the called line busy to any other connector circuit. Contacts 5 of relay 903 operated remove relay 908 from the tip and ring circuit of the called line.

Inductance 904 supplies talking battery to the called party. Condensers 905 and 906 isolate the talking battery supplied by inductance 904 from the talking battery supplied to the calling party by relay 900.

The operation of relay 908 also operates relay 902 which locks over its contacts 3 to a ground supplied by relay 901 operated. Contacts 1 and 2 of relay 902 operated reverse the potential of the talking battery supplied to the calling party. This reversal of talking battery to the calling party reverses the potential across the varistor network in the subset of the calling party so that it now becomes an effective open circuit across his transmitter. In this condition the transmitter will respond to the sound waves received and cause them to be transmitted over the line.

The circuit is now completed between the two subscribers so that talking may now take place. This condition persists until the calling party breaks the tip and ring circuit by replacing the receiver on his subset. As the tip and ring circuit of the calling party is broken, relays 900 and 901 release which removes holding ground from the entire circuit and permits it to restore to normal.

The completed call just described was a call between two private parties. In completing this call the switching was entirely performed by high-speed electronic devices controlled by frequencies generated in the calling party's subset. The connection about to be described assumes that the calling party desires to communicate with a party having a plurality of incoming lines all bearing the same directory designation and served by a PBX. As previously explained, such equipment is used when it is desired to represent the many lines of a large business establishment by a single directory number in order to more efficiently utilize directory numbers. The equipment shown in Fig. 11 discloses a PBX hunting circuit which when seized by a connector circuit will connect the calling party to an idle line in a group of lines available to the PBX hunting circuit.

In the previous call it was assumed that the calling subscriber desired to communicate with subscriber 009. If the calling subscriber now wishes to communicate with a party served by the PBX hunting circuit, he will depress and release the proper digit keys in order to connect himself with the connector circuit shown diagrammatically in the bottommost part of Fig. 10 or with any other connector that serves this PBX circuit. Upon operating the proper digit keys, the seized connector operates and seizes the tip, ring and sleeve leads of the PBX circuit shown in Fig. 11. As many PBX hunting circuits of the type shown in Fig. 11 could be provided as may be desired in order that many connectors may have access to the PBX circuits at the same time.

A relay similar to relay 903, but in the connector circuit which seizes the PBX hunting circuit, operates and places ground on the incoming sleeve lead of the PBX hunting circuit as the connector seizes the tip, ring and sleeve leads of this circuit. The tip and ring leads of the connector which seizes this circuit are cut through to banks B and C of rotary switch 1102. The sleeve lead of the connector is cut through to relay 1001 which operates from the ground supplied by the connector. Contacts 1 of relay 1101 operated extend a ground through contacts 1 of relay 1100 normal, through contacts 3 of relay 1106 normal, to the winding of relay 1110 which operates and locks over its contacts 4 to a ground on contacts 4 of relay 1106 normal. Contacts 2 of relay 1101 operated connect the negative battery from the winding of relay 1100 to a contact on bank A of rotary switch 1102. The purpose of this circuit will be described later.

Contacts 1 of relay 1110 operated extend a ground through contact 1 of relay 1109 normal, through the self-interrupted contacts of rotary switch 1102 to the winding of this switch which now commences operation on a self-interrupted basis from this ground.

The wipers of banks A, B and C of rotary switch 1102 rotate as this switch operates on a self-interrupted basis. This operation continues until the wipers engage the particular contact on each bank to which the tip, ring and sleeve leads of the calling party are connected. As the wipers engage the contacts to which the calling party is connected, the negative battery supplied by relay 1100 is extended through the contact and wiper on bank A of rotary switch 1102, through contacts 3 on relay 1105 normal, to the winding of relay 1109 which now operates. The operation of contacts 1 of relay 1109 removes the ground from rotary switch 1102 which ceases its rotary operation and connects this ground to a second winding of relay 1109 which locks operated.

Relay 1100 operates in series with relay 1109 and locks operated over its contacts 2 to ground supplied by the incoming sleeve lead. Contacts 1 of relay 1100 operated removes the ground lead from contacts 3 of relay 1106 normal which originally supplied the ground to operate relay 1110. However, relay 1110 remains operated at this time over a locking circuit previously described.

Relay 1110 operated also supplies ground over its contacts 1, through contacts 2 of relay 1104 normal, through contacts 2 of relay 1108 normal, to the contacts and winding of rotary switch 1107 which now commences operation on a self-interrupted basis. This self-interrupted operation of rotary switch 1107 continues until its wipers are connected with tip, ring and sleeve leads leading to an idle line serving the called party.

Let it be assumed that relays 1111 and 1112 are normal and are connected to an idle PBX trunk circuit. Assuming that relays 1111 and 1112 represent the first idle trunk circuit encountered, as rotary switch 1107 engages the contacts leading to this circuit, the negative potential from the winding of relay 1112 is extended through the contact and wiper of bank A of rotary switch 1107, through contacts 5 of relay 1105 normal, to the winding of relay 1108 which operates in series with relay 1112. Relay 1108 operated locks over its contacts 3 to the ground on contacts 1 of relay 1110 operated. Contacts 2 of relay 1108 operated removes the ground from the operating circuit of rotary switch 1107 which ceases its rotary action. Contacts 1 of relay 1108 operated extends the ground from contacts 2 of relay 1109 operated through to the winding of relay 1105 which operates and locks over its contacts 2 top to the ground supplied by the sleeve of the connector circuit on the wiper of bank A of rotary switch 1102. Contacts 2 bottom of relay 1105 operated supply a ground to operate relay 1106. Contacts 4 of relay 1106 operated remove the holding ground from relay 1110 which releases and in turn removes the holding ground from relays 1108 and 1109 which also release.

Figure 11:
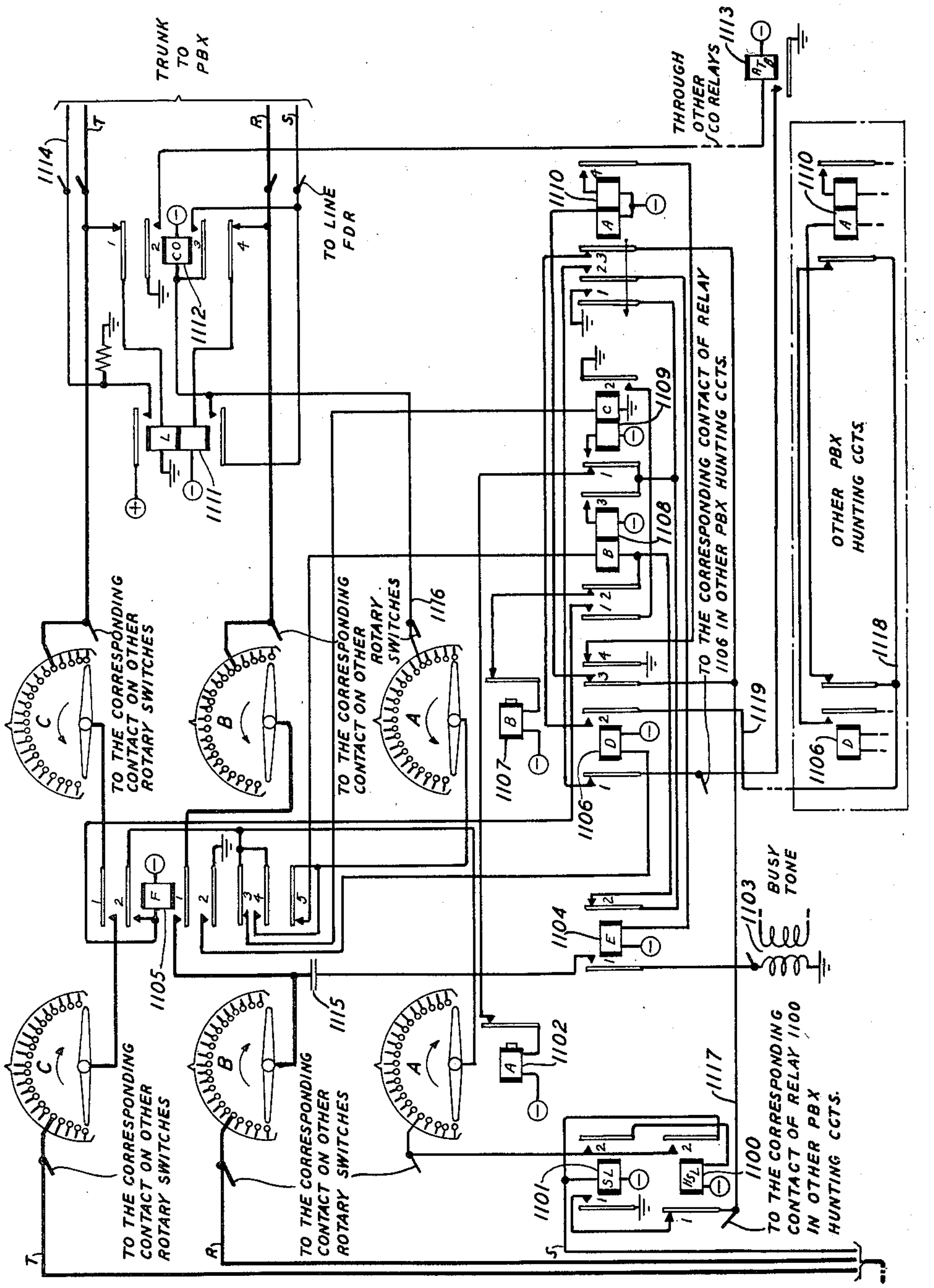
Fig. 11 illustrates a PBX trunk hunting circuit.

At this time conductor 1117 may be supplied with a ground by the relays associated with other connector circuits and corresponding to relays 1100 and 1101 of Fig. 11. This ground is extended through contracts 3 of relay 1110 normal, through contacts 2 of relay 1106 operated to conductor 1119 which leads to other PBX hunting circuits. The purpose of this circuit is described later.

Contacts 1 top and 1 bottom of relay 1105 operated connect the tip and ring of the calling party through to the tip and ring leads leading to a trunk serving the called party. Contacts 3 of relay 1105 operated break the energizing path for relay 1109. Contacts 4 of relay 1105 operated place a ground on conductor 1116 in order to make this particular trunk serving the called party appear busy to any other PBX hunting circuits. Contacts 5 of relay 1105 operated break the operating path for relay 1108.

Contacts 1 and 4 of relay 1112 operated disconnect line relay 1111 from the tip and ring leads. Contacts 3 of relay 1112 operated apply the incoming sleeve ground to the sleeve lead of the called line.

The calling party is now connected through the selector and connector circuits, through the PBX hunting circuit to an idle line in the group of lines serving the called party. Ringing and talking now take place in a manner similar to that already described. Upon termination of the call the subscriber will replace his handset which breaks the tip and ring circuit and thereby allows the entire system to restore to normal in a manner previously described.

If all the trunks should be busy when this circuit is seized, a chain circuit through the contacts of all relays 1112 operated will operate a relay 1113 common to all trunks in this PBX group. As soon as relay 1110 operates, the operation of relay 1113 operates relay 1104 over a path including contacts 1 of relay 1106 normal and contacts 2 of relay 1110 operated. Contacts 2 of relay 1104 operated break the start circuit for rotary switch 1107 and thereby halts its rotary action. Contacts 1 of relay 1104 operated supply a busy tone through condenser 1115 to the ring of the calling party who then will replace his receiver and abandon the call.

The equipment comprising the PBX hunting circuits includes a plurality of the individual hunting circuits as shown on Fig. 11 and a relay 1100 and a relay 1101 individual to each pair of lines leading from the connectors which can seize this group of PBX hunting circuits. The number of such hunting circuits as shown on Fig. 11 will usually be equal to the number of incoming lines available to each PBX hunting circuit as determined by the number of contacts on each arc of rotary switch 1102.

The relays 1100 and 1101 associated with each connector circuit are so arranged that as their line is seized and as relay 1101 operates, the ground from its contacts 1 operated is supplied through contacts 1 of relay 1100 normal to conductor 1117. This feature is shown on Fig. 11 by the arrow leading from the junction of contacts 1 of relay 1100 and conductor 1117 to the corresponding contact of the relay 1100 associated with every other incoming line to this group of hunting circuits. Thus, conductor 1117 will have a ground on it not only when the relay 1101 shown in Fig. 11 operates, but also when the relay 1101 associated with any other incoming line operates. As a result, conductor 1117 will have a ground thereon and will energize the specific hunting circuit shown in Fig. 11 when any one of the incoming lines to this group of hunting circuits is seized and operates its associated relay 1101 which extends a ground through contacts 1 of the associated relay 1100 normal to conductor 1117. This ground on conductor 1117 will energize the rotary switches and relays associated therewith and extend the call through to the called party in a manner as previously described.

It is, of course, possible that two incoming lines to this group of hunting circuits may be seized at once and will in turn both place a ground on conductor 1117 from the relays 1101 associated with each of the seized lines. This condition will cause no trouble and the calling party whose conductors are first engaged by a rotary switch 1102 will be the party to be served by the specific hunting circuit shown in Fig. 11. The other calling party will be served a short instant of time later in a manner about to be described.

Following is a description of how the individual hunting circuits are arranged so that they will serve calls to the plurality of incoming lines in case one or more lines are seized simultaneously or in case one or more circuits are busy when a new call arises. It is to take care of this situation that the arc contacts of rotary switches 1102 and 1107 are wired in parallel with the corresponding arc contacts of the corresponding rotary switches in all the PBX hunting circuits. Let it be assumed that two or more incoming lines to this group of PBX hunting circuits are seized simultaneously. The operation of the relay 1101 associated with each seized incoming line places a ground on conductor 1117. Rotary switch 1102 will be energized in a manner previously described and will rotate until it arrives at the terminals of one of the calling lines. It will then cease hunting and serve the call for this set of incoming lines. The ground remaining on conductor 1117, as supplied by the other calling line or lines and their operated relay 1101 associated therewith, is extended through contacts 3 of relay 1110 normal, through contacts 2 of relay 1106 operated, and down to another PBX hunting circuit whose rotary switches and relays associated therewith will operate and serve the party connected to the first set of calling contacts it engages. In case more than two incoming lines were seized simultaneously this action would continue and after the second PBX hunting circuit shown diagrammatically on Fig. 11 had served its call, it would extend a ground from its conductor 1118 down through contacts 2 of its relay 1106 to the rotary switches and relays of the next PBX hunting circuit, which would then hunt and serve the call of the third party who seized this group of PBX circuits simultaneously with the calls of the first two parties.

It is to be understood that the above-described arrangements are but illustrative of the application of the principles of the invention. Numerous other arrangements may be devised by those skilled in the art without departing from the spirit and scope of the invention.

What is claimed is:

1. In a telephone switching system, a plurality of subscriber stations, a plurality of transmission lines each of which is connected at its one end to an individual one of said subscriber stations, a switching center to which is connected the other end of each of said transmission lines, voice frequency signal generators located at each of said subscriber stations for simultaneously transmitting over said transmission lines two voice frequency signals for each symbol of a called subscriber station designation upon the initiation of a call, a plurality of selectively operable switching stages in said switching center, and means at the first stage responsive to the first two voice frequency signals simultaneously transmitted by a subscriber station whereby the succeeding simultaneously transmitted voice frequency signals are transmitted to a succeeding stage.

2. In a telephone switching system, a plurality of subscriber stations, a plurality of transmission lines with each of said lines being connected at its one end to an individual one of said subscriber stations, a switching center to which is connected the other end of each of said transmission lines, voice frequency signal generators located at each of said subscriber stations for simultaneously transmitting over said transmission lines two-voice frequency signals for each symbol of a called subscriber station designation upon the initiation of a call, a plurality of selectively operable switching stages in said switching center, means at the first stage responsive to the first two voice frequency signals simultaneously transmitted by a subscriber station whereby the succeeding simultaneously transmitted voice frequency signals are transmitted to the succeeding switching stage, means in said succeeding switching stage responsive to the next two additional pairs of simultaneously transmitted voice frequency signals to cause said stage to selectively operate the switching equipment therein, and means responsive to the operation of said switching equipment, to connect said last-named stage to the transmission line associated with the called subscriber station.

3. In a telephone switching system, a switching center, a first switching stage in said switching center, a plurality of subscriber stations connected by lines to said switching center, a second switching stage in said switching center, trunk circuits interconnecting said switching stages, calling apparatus at each subscriber station for transmitting a series of pairs of simultaneous audio frequency signals representing a called station designation to the switching center upon the initiation of a call, responsive apparatus and selective path establishing means at said first switching stage whereby upon the reception of the first pair of simultaneously transmitted audio frequency signals a path is selectively established through said switching stage to one of said trunk circuits, and responsive apparatus at said second switching stage whereby upon the reception of additional pairs of simultaneously transmitted audio frequency signals from said subscriber station a transmission path is established through said second switching stage to the called line of the subscriber station designated by the series of simultaneously transmitted audio frequency signals.

4. In a telephone switching system, a switching center, a selector switching stage and a connector switching stage in said switching center, a plurality of subscriber stations, transmission lines between said subscriber stations and said switching center, trunk circuits interconnecting said selector and connector switching stages, apparatus at each of said subscriber stations for transmitting pairs of simultaneous audio frequency signals over said transmission lines for each symbol of a called station designation upon the initiation of a call, means at said selector switching stage whereby upon the reception of the first pair of audio frequency signals simultaneously transmitted a path is selectively established from the calling subscriber station through said selector switching stage to a trunk circuit connected to said connector switching stage, and apparatus at said connector switching stage whereby the reception of additional pairs of simultaneously transmitted audio frequency signals causes a path to be selectively established through said connector switching stage to the transmission line of the called subscriber.

5. In a telephone switching system, a switching center comprising a selector switching stage and a connector switching stage, a plurality of subscriber stations, transmission lines interconnecting said subscriber stations and said switching center, apparatus at said subscriber stations for transmitting a pair of simultaneous audio frequency signals on a code basis over said transmission lines for each symbol of a called station designation upon the initiation of a call, a first group of selectively operable tubes in said selector stage, means responsive to the first pair of audio frequency signals transmitted to cause the selective operation of one of said tubes, a plurality of trunk circuits interconnecting said selector and connector switching stages, each of said trunk circuits having an idle and a busy condition, a second group of tubes in said selector stage each of which is exclusively associated with one of said trunk circuits, means whereby each of said trunk circuits that is in an idle condition applies a potential to its related tube in an attempt to operate said tube in response to the operation of one tube in said first group of tubes, means whereby only one tube in said second group of tubes will operate out of all the tubes upon which an operating potential is placed by its associated trunk circuit, means operative in response to the operation of said last-named tube to close a path in said selector switching stage from the transmission line of a calling party to the trunk circuit associated with the operated tube in said second group of tubes, and apparatus at said connector switching stage whereby the reception of the next two pairs of simultaneously transmitted audio frequency signals causes a path to be selectively established through said connector switching stage to the transmission line of the called subscriber.

6. In a telephone switching system, a switching center comprising a selector switching stage and a connector switching stage, a plurality of subscriber stations, transmission lines interconnecting said subscriber stations and said switching center, trunk circuits interconnecting said selector and connector switching stages, apparatus at said subscriber stations for transmitting a pair of simultaneous audio frequency signals over said transmission lines for each symbol of a called station designation upon the initiation of a call, means at said selector switching stage whereby upon the reception of the first pair of audio frequency signals simultaneously transmitted a path is selectively established from the calling subscriber through said selector switching stage to a trunk circuit connected to said connector switching stage, a first group of selectively operable tubes in said connector stage, means responsive to the next pair of audio frequency signals transmitted to cause the selective operation of one of said tubes, a second group of selectively operable tubes in said connector stage, means responsive to the next pair of audio frequency signals transmitted to cause the selective operation of one of said last-named tubes, and means responsive to the selective operation of said last-named tube whereby a path is established in the connector stage between said trunk circuit and the transmission line of the called party.

7. In a telephone switching system, a switching center comprising a selector switching stage and a connector switching stage, a plurality of subscriber stations, transmission lines interconnecting said subscriber stations and said switching center, apparatus at said subscriber stations for transmitting a pair of simultaneous audio frequency signals on a code basis over said transmission lines for each symbol of a called station designation upon the initiation of a call, a first group of selectively operable tubes in said selector stage, means responsive to the first pair of audio frequency signals transmitted to cause the selective operation of one of said tubes, a plurality of trunk circuits interconnecting said selector and connector switching stages, each of said trunk circuits having an idle and a busy condition, a second group of tubes in said selector stage each of which is exclusively associated with one of said trunk circuits, means whereby each of said trunk circuits that is in an idle condition applies an operating potential to its related tube in an attempt to operate said tube in response to the operation of one tube in said first group of tubes, means whereby only one tube in said second group of tubes will operate out of all the tubes upon which an operating potential is placed by its associated trunk circuit, means operative in response to the operation of said one tube in said second group of tubes to close a path in said selector switching stage from the transmission line of a calling party to the trunk circuit associated with the operated tube in said second group of tubes, a first group of selectively operable tubes in said connector stage, means responsive to the next pair of audio frequency signals transmitted to cause the selective operation of one of said last-named tubes, a second group of selectively operable tubes in said connector stage, means responsive to the next pair of audio frequency signals transmitted to cause the selective operation of one of said last-named tubes, and means responsive to the operation of said last-named tube whereby a path is selectively established in the connector stage between said trunk circuit and the transmission line of the called party.

8. In a selector switching circuit, an incoming line, a plurality of outgoing lines having an idle and a busy condition, a first group of selectively operable cold cathode tubes, means responsive to signals received over said incoming line, means whereby the operation of said responsive means upon receipt of signals over said incoming line selectively operates one of said cold cathode tubes, a second group of cold cathode tubes each of which is individually associated with one of said outgoing lines, means responsive to the operation of one of said tubes in said first group of tubes whereby each of said outgoing lines that is currently in an idle condition applies an operating potential to its associated tube, means whereby only one tube in said second group of tubes operates out of all the tubes upon which an operating potential is currently placed, and means operated in response to the operation of said last-named tube whereby a transmission path is established in said selector switching circuit from the incoming line to the outgoing line associated with the tube that operated in said second group of tubes.

9. In a connector switching circuit, an incoming line, a plurality of outgoing lines, a first group of selectively operable cold cathode tubes, means responsive to signals received over said incoming line, means whereby the first operation of said responsive means upon the receipt of signals over said incoming line selectively operates one of said cold cathode tubes, a second group of selectively operable cold cathode tubes, means whereby the second operation of said responsive means upon the receipt of additional signals over said incoming line selectively operates one of said cold cathode tubes in said second group of tubes, and means responsive to the operation of said last-named tube whereby a transmission path is selectively established in said connector switching circuit from the incoming line to one of said outgoing lines.

10. In a connector switching circuit, an incoming line, a plurality of outgoing lines, a first group of selectively operable cold cathode tubes, means responsive to signals received over said incoming line, means whereby the first operation of said responsive means upon the receipt of signals over said incoming line selectively operates one of said cold cathode tubes, a second group of selectively operable cold cathode tubes, means whereby the second operation of said responsive means upon the receipt of additional signals over said incoming line selectively operates one of said cold cathode tubes in said second group of tubes, means responsive to the operation of said last-named tube whereby a transmission path is selectively established in said connector switching circuit from the incoming line to one of said outgoing lines, a third group of cold cathode tubes, means whereby the third operation of said responsive means upon the receipt of additional signals over said incoming line selectively operates one of said tubes in said third group of tubes, and means whereby upon the operation of said last-named tube a signaling potential is applied to said one outgoing line.

11. In a telephone switching system, a plurality of subscriber stations, a plurality of transmission lines each of which is connected at its one end to an individual one of said subscriber stations, a switching center being connected to the other end of said transmission lines, means at said switching center for supplying a direct current potential over each of said lines to the subscriber station associated with each line, a plurality of contacts at each of said subscriber stations with a plurality of said contacts being successively operated by a subscriber when attempting to initiate a call, a plurality of electrically operated voice frequency signal generators at each of said subscriber stations, means whereby the operation of any one of said contacts by a subscriber while attempting to initiate a call causes the application of said direct current potential to two of said plurality of voice frequency signal generators and thereby causes said generators simultaneously to impress two-voice frequency signals on the line associated with the subscriber attempting to initiate a call, and a plurality of successively and selectively operable switching stages in said switching center with means in each stage responsive to two-voice frequency signals simultaneously applied to said line for selectively operating the switching apparatus contained therein.

12. In a telephone switching system, a plurality of subscriber stations, a plurality of transmission lines each of which is connected at its one end to an individual one of said subscriber stations, a switching center to which is connected the other end of each of said transmission lines, means at said switching center for supplying a direct current potential to each of said subscriber stations over the transmission line individually associated therewith, a plurality of contacts at a plurality of said subscriber stations with each of said contacts being successively operated by a subscriber when attempting to initiate a call, a plurality of electrically operated voice frequency signal generators at each of said subscriber stations, means at each station whereby the operation of any one of said contacts by a subscriber attempting to initiate a call causes the application of said direct current potential to two of said plurality of voice frequency signal generators and thereby causes said generators simultaneously to impress two audio frequency signals on its related line, a plurality of successively and selectively operable switching stages in said switching center, means at the first stage responsive to the first two-voice frequency signals simultaneously impressed on said line by a subscriber station whereby the succeeding simultaneously transmitted voice frequency signals are transmitted to the succeeding switching stage, means in said succeeding switching stage responsive to the next two additional pairs of simultaneously generated voice frequency signals to cause said stage selectively to operate the switching equipment therein, and means responsive to said last-named operation to connect said last-named stage to the transmission line associated with a called subscriber station.

13. In a telephone switching system, a plurality of groups of subscriber stations, a selector switching center comprising a plurality of selector switching circuits, a line finder switching circuit operable to interconnect any one of said subscriber stations with a selector switching circuit, a first group of tubes in said line finder switching circuit, each tube in said first group of tubes being individually associated with one of said groups of subscriber stations, means at said line finder switching circuit responsive to an attempt to initiate a call by one or more subscriber stations whereby a tube in said first group of tubes is energized that is associated with one or more of the stations attempting to initiate a call, a second group of tubes in said line finder circuit, each tube in said second group being individually associated with one of said subscriber stations in the group associated with said energized tube in said first group of tubes upon the energization of said tube in said first group of tubes, circuit means associated with said second group of tubes to cause the energization of a tube in said second group of tubes that is individually associated with a subscriber station that is attempting to initiate a call, and means at said line finder switching circuit responsive to the energization of said last-named energized tube to interconnect the subscriber station associated with said last-named energized tube with a selector switching circuit.

14. In a telephone switching system, a plurality of groups of subscriber stations, a selector switching circuit, a line finder switching circuit operable to interconnect any one of said subscriber stations with said selector switching circuit, a first group of tubes in said line finder switching circuit, each tube being individually associated with one of said groups of subscriber stations, means in said line finder switching circuit operative when subscribers in more than one group attempt to initiate a call whereby only one of said tubes associated with a group currently containing a calling subscriber is operated, a second group of tubes in said line finder circuit with each tube in said second group being individually associated with one of said subscriber stations in the group of stations associated with said one operated tube in said first group of tubes upon the operation of said one tube, circuit means associated with said second group of tubes to cause the operation of a tube in said second group of tubes that is associated with a subscriber station currently attempting to initiate a call, and means in said line finder circuit responsive to the operation of said last-named tube to interconnect the subscriber station associated with said last-named tube with the selector switching circuit.

References Cited in the file of this patent

UNITED STATES PATENTS

| | | |
|---|---|---|
| 2,204,759 | Hubbard | June 18, 1940 |
| 2,277,228 | Hecht | Mar. 24, 1942 |
| 2,308,778 | Prince | Jan. 19, 1943 |
| 2,317,471 | Meacham | Apr. 27, 1943 |
| 2,580,095 | Holden | Dec. 24, 1951 |
| 2,773,934 | Trousdale | Dec. 11, 1956 |